US00RE44890E

(19) United States
(12) Reissued Patent
Kumasawa

(10) Patent Number: US RE44,890 E
(45) Date of Reissued Patent: May 13, 2014

(54) AUTHENTICITY INDICATOR

(71) Applicant: Dai Nippon Printing Co., Ltd., Tokyo (JP)

(72) Inventor: Tomoko Kumasawa, Tokyo (JP)

(73) Assignee: Dai Nippon Printing Co., Ltd., Tokyo (JP)

(21) Appl. No.: 13/801,008

(22) Filed: Mar. 13, 2013

Related U.S. Patent Documents

Reissue of:
(64) Patent No.: 7,940,436
Issued: May 10, 2011
Appl. No.: 11/727,831
Filed: Mar. 28, 2007

(30) Foreign Application Priority Data

Mar. 31, 2006 (JP) ..... 2006-098452

(51) Int. Cl.
*G03H 1/00* (2006.01)

(52) U.S. Cl.
CPC ..... *G03H 1/0011* (2013.01)
USPC ..... 359/2; 283/86

(58) Field of Classification Search
None
See application file for complete search history.

(56) References Cited

U.S. PATENT DOCUMENTS 5,570,207 A 10/1996 Chang
2002/0051264 A1 5/2002 Shiozawa et al.
2004/0263850 A1 12/2004 Li et al.
2005/0139792 A1 6/2005 Rivera et al.
2007/0211318 A1 9/2007 Miura et al.

FOREIGN PATENT DOCUMENTS

JP A 11-151877 6/1999
JP A 2000-211300 8/2000
JP A-2002-333817 11/2002
JP B2 3652487 3/2005
WO WO 00/13065 3/2000

OTHER PUBLICATIONS

Feb. 15, 2011 Office Action issued in Japanese Patent Application No. 2006-098452 (with translation).
Jul. 8, 2011 Office Action issued in Japanese Patent Application No. 2006-098452 (with translation).

*Primary Examiner* — Derek S Chapel
(74) *Attorney, Agent, or Firm* — Oliff PLC

(57) ABSTRACT

An authenticity indicator is difficult to be forged and has an authenticity that can be confirmed easily and accurately. The authenticity of the authenticity indicator can be checked by making light enter the authenticity indicator from front side and observing the light emerging from the front side or rear side. The authenticity indicator includes a polarized-light selectively reflecting layer that reflects a specified polarized component of incident light, and a transmission volume hologram layer disposed on the front side of the polarized-light selectively reflecting layer. According to this authenticity indicator, its authenticity can be checked accurately by making use of its first authenticity recognition function attributed to the diffracting action of the transmission volume hologram layer and its second authenticity recognition function attributed to the polarized-light selectivity of the polarized-light selectively reflecting layer.

19 Claims, 8 Drawing Sheets

AUTHENTICITY INDICATOR

Matter enclosed in heavy brackets [ ] appears in the original patent but forms no part of this reissue specification; matter printed in italics indicates the additions made by reissue.

CROSS-REFERENCE TO RELATED APPLICATION

This application is based on Japanese Patent Application No. 2006-098452 filed on Mar. 31, 2006, and the entire contents of Application No. 2006-098452 is incorporated herein by reference.

BACKGROUND OF THE INVENTION

1. Field of the Invention

The present invention relates to an authenticity indicator to be used to indicate that an article or the like is authentic, and particularly to an authenticity indicator whose authenticity can be checked easily and accurately. The present invention also relates to an authenticity checking method for checking the authenticity of an authenticity indicator to be used to indicate that an article or the like is genuine, and an authenticity checking system useful for checking the same, and particularly to an authenticity checking method and system by which the authenticity of the authenticity indicator can be checked easily and accurately.

2. Related Art

Hologram labels, etc. using holograms, serving as authenticity indicators (identification media), have been attached to genuine articles as a means of preventing forgery of cards, passports, ID cards, gift certificates, etc., or of detecting forgeries, fakes, or the like. It is therefore essential for the authenticity indicators that they are difficult to be forged and that the authenticity of the authenticity indicators themselves can be checked accurately.

In recent years, however, techniques for forgery of holograms of this type have advanced, and holographic materials have become easily available, so that there are possibilities that the hologram labels might be skillfully forged and that the forged hologram labels might be overlooked while they are practically used.

Cholesteric liquid crystals, which have both polarized-light selectivity and wavelength selectivity and reflect light so that the reflected light changes in color when an observer changes his viewing angle, have also been used for authenticity indicators. However, forgery techniques have advanced in recent years, and even authenticity indicators using cholesteric liquid crystals are in danger of forgery.

Authenticity indicators using holograms and cholesteric liquid crystals in combination are now being developed (e.g., Japanese Patent Publication No. 3652487 and Japanese Laid-Open Patent Publication No. 2000-211300).

Japanese Patent Publication No. 3652487 discloses an authenticity indicator using a relief hologram layer and a cholesteric liquid crystal layer in combination. In this authenticity indicator, the cholesteric liquid crystal layer is used as a layer for reflecting the relief hologram. Since relief holograms are relatively easy to be forged, the authenticity indicator disclosed in this patent publication can only have a forgery preventing effect comparable to that of an authenticity indicator using a cholesteric liquid crystal layer alone.

Japanese Laid-Open Patent Publication No. 2000-211300 discloses an authenticity indicator using a reflection hologram layer and a cholesteric liquid crystal layer in combination. In this authenticity indicator, the cholesteric liquid crystal layer serves as a layer for reflecting light that has passed through the reflection hologram without being diffracted by it. The reflection hologram layer diffracts (reflects) only light with wavelengths in a narrow wavelength range centering around a specified wavelength, responding to the wavelength selectivity of the reflection hologram. This authenticity indicator is therefore disadvantageous in that it is difficult to confirm the authenticity of the authenticity indicator by the diffracted light from the reflection hologram layer, or that an expensive device such as a highly sensitive light-receiving unit is needed for authenticity checking.

SUMMARY OF THE INVENTION

The present invention was accomplished in the light of the above-described drawbacks in the prior art. An object of the present invention is therefore to provide an authenticity indicator to be used to indicate that an article or the like is authentic, which cannot be easily forged and whose authenticity can be checked with ease and accuracy. Another object of the present invention is to provide an authenticity checking method and system by which the authenticity of the authenticity indicator can be checked easily and accurately.

An authenticity indicator according to the present invention is one in the form of a sheet, whose authenticity can be checked by means of light emerging therefrom to front side or light emerging therefrom to rear side, comprising: a polarized-light selectively reflecting layer that reflects a specified polarized component of incident light, and a transmission volume hologram layer disposed on the front side of the polarized-light selectively reflecting layer.

According to this authenticity indicator of the present invention, its authenticity can be accurately checked by making use of its first authenticity recognition function attributed to the diffracting action of the transmission volume hologram layer and its second authenticity recognition function attributed to the polarized-light selectivity of the polarized-light selectively reflecting layer. Specifically, for example, the authenticity of the authenticity indicator can be checked by letting light enter the transmission volume hologram layer at an angle that meets diffraction condition of the transmission volume hologram layer and observing whether the transmission volume hologram layer shows a diffracting action or not, preferably whether the image recorded in the transmission volume hologram layer is reconstructed or not. The authenticity of the authenticity indicator can also be checked by confirming the state of polarization of the light emerging from the authenticity indicator by the use of an absorption polarizer or the like. In particular, the authenticity of the authenticity indicator can be checked more accurately by the diffracted light that is relatively bright, or, if an image has been recorded in the transmission volume hologram layer, by the reconstructed image that is relatively bright. Further, since the recording of an image to give a transmission volume hologram and the duplication of a transmission volume hologram require sophisticated techniques and special facilities, and also special materials whose distribution is supervised, it is extremely difficult to forge the transmission volume hologram layer.

In the authenticity indicator of the present invention, the polarized-light selectively reflecting layer may have a cholesteric liquid crystalline structure. According to such an authenticity indicator of the invention, the polarized-light selectively reflecting layer has also wavelength selectivity. Therefore, the authenticity of this authenticity indicator can be checked more accurately.

Further, in the authenticity indicator of the present invention, the transmission volume hologram layer may diffract, approximately vertically to the authenticity indicator, light entering from the front side at a specified angle and allow the diffracted light to emerge from the transmission volume hologram layer to rear side. According to such an authenticity indicator of the invention, the light that is reflected from the polarized-light selectively reflecting layer after being diffracted by the transmission volume hologram layer and emerges from the authenticity indicator to the front side contains a specified polarized-light component. Therefore, by passing the light that has emerged from the authenticity indicator through an absorption polarizer capable of absorbing the specified polarized-light component, it is possible to make the diffracted light, e.g., the image reconstructed from the transmission volume hologram layer, invisible.

Alternatively, in the authenticity indicator of the present invention, the transmission volume hologram layer may diffract, approximately vertically to the authenticity indicator, light entering from rear side at a specified angle after being reflected from the polarized-light selectively reflecting layer and allow the diffracted light to emerge from the transmission volume hologram layer to the front side. According to such an authenticity indicator of the invention, the light emerging from the authenticity indicator after being diffracted by the transmission volume hologram layer contains a specified polarized-light component. Therefore, by passing the light that has emerged from the authenticity indicator through an absorption polarizer capable of absorbing the specified polarized-light component, it is possible to make the diffracted light, e.g., the image reconstructed from the transmission volume hologram layer, invisible.

A first authenticity checking method according to the present invention comprises the steps of making light enter an authenticity indicator from front side, the authenticity indicator comprising a polarized-light selectively reflecting layer that reflects a specified polarized component of incident light, and a transmission volume hologram layer disposed on the front side of the polarized-light selectively reflecting layer; and checking the authenticity of the authenticity indicator by means of light emerging from the authenticity indicator to the front side.

According to this first authenticity checking method of the present invention, the authenticity of the authenticity indicator can be accurately checked by making use of the first authenticity recognition function of the authenticity indicator, attributed to the diffracting action of the transmission volume hologram layer, and the second authenticity recognition function of the authenticity indicator, attributed to the polarized-light selectivity of the polarized-light selectively reflecting layer. If an image has been recorded in the transmission volume hologram layer, this image can be reconstructed relatively brightly. Further, since the recording of an image to give a transmission volume hologram and the duplication of a transmission volume hologram require sophisticated techniques and special facilities, and also special materials whose distribution is supervised, it is extremely difficult to forge the transmission volume hologram layer.

A second authenticity checking method according to the present invention comprises the steps of making light enter an authenticity indicator from front side, the authenticity indicator comprising a polarized-light selectively reflecting layer that reflects a specified polarized component of incident light, and a transmission volume hologram layer disposed on the front side of the polarized-light selectively reflecting layer; and checking the authenticity of the authenticity indicator by means of light emerging from the authenticity indicator to the front side and light emerging from the authenticity indicator to rear side.

According to such a second authenticity checking method of the present invention, the authenticity of the authenticity indicator can be accurately checked by making use of the first authenticity recognition function of the authenticity indicator, attributed to the diffracting action of the transmission volume hologram layer, and the second authenticity recognition function of the authenticity indicator, attributed to the polarized-light selectivity of the polarized-light selectively reflecting layer. If an image has been recorded in the transmission volume hologram layer, this image can be reconstructed relatively brightly. Further, since the recording of an image to give a transmission volume hologram and the duplication of a transmission volume hologram require sophisticated techniques and special facilities, and also special materials whose distribution is supervised, it is extremely difficult to forge the transmission volume hologram layer.

In the step of checking the authenticity of the authenticity indicator in the authenticity checking method according to the present invention, the authenticity of the authenticity indicator may be checked by observing light that has passed through an absorption polarizer after emerging from the authenticity indicator. According to this authenticity checking method of the invention, the authenticity of the authenticity indicator can be checked more accurately, for example, by observing the brightness of the light emerging from the authenticity indicator to the rear side, by confirming whether the image recorded in the transmission volume hologram layer is reconstructed or not, or by observing the brightness of the reconstructed image. The absorption polarizer is placed so that either the light that will enter the authenticity indicator or the light that has emerged from the authenticity indicator passes through it.

Further, in the step of checking the authenticity of the authenticity indicator in the authenticity checking method according to the present invention, the authenticity of the authenticity indicator may be checked by observing the light that has passed through a band pass filter after emerging from the authenticity indicator. According to this authenticity checking method of the invention, the authenticity of the authenticity indicator can be checked more accurately, for example, by observing the brightness of the light emerging from the authenticity indicator to the rear side, by confirming whether the image recorded in the transmission volume hologram layer is reconstructed or not, or by observing the brightness of the reconstructed image. The band pass filter is placed so that either the light that will enter the authenticity indicator or the light that has emerged from the authenticity indicator passes through it.

Furthermore, in the authenticity checking method according to the present invention, the transmission volume hologram layer may have an image recorded therein, and in the step of checking the authenticity of the authenticity indicator, the authenticity may be checked by confirming whether the light emerging from the authenticity indicator reconstructs the image or not, or by confirming whether the light emerging from the authenticity indicator reconstructs the image or not and also observing brightness of the reconstructed image. According to such an authenticity checking method of the invention, the image recorded in the transmission volume hologram layer can be observed from the front side or the rear side of the authenticity indicator, so that the authenticity of the authenticity indicator can be checked more accurately.

Moreover, by taking the brightness of the reconstructed image into account, the authenticity of the authenticity indicator can be checked with still higher accuracy.

Furthermore, in the step of making light enter the authenticity indicator in the authenticity checking method according to the present invention, light may be allowed to enter the authenticity indicator so that the light enters the transmission volume hologram layer from the front side at an angle that meets diffraction condition of the transmission volume hologram layer. According to such an authenticity checking method of the invention, the light emerging from the authenticity indicator can be provided with the properties of polarized light, so that the authenticity of the authenticity indicator can be checked with still higher accuracy by making use of these properties.

Alternatively, in the step of making light enter the authenticity indicator in the authenticity checking method according to the present invention, light may be allowed to enter the authenticity indicator so that, after being reflected from the polarized-light selectively reflecting layer, light enters the transmission volume hologram layer from rear side at an angle that meets diffraction condition of the transmission volume hologram layer. According to such an authenticity checking method of the invention, the light emerging from the authenticity indicator can be provided with the properties of polarized light, so that the authenticity of the authenticity indicator can be checked with still higher accuracy by making use of these properties.

A first authenticity checking system according to the present invention for checking the authenticity of an authenticity indicator comprising a polarized-light selectively reflecting layer that reflects a specified polarized component of incident light, and a transmission volume hologram layer disposed on front side of the polarized-light selectively reflecting layer, the first authenticity checking system comprises a front side checking unit having a front side light-receiving device that is disposed on the front side of the authenticity indicator and receives, of the incident light on the authenticity indicator, light that has emerged from the authenticity indicator to the front side, wherein the front side checking unit is configured to check the authenticity of the authenticity indicator based on data on the light received by the front side light-receiving device.

According to this first authenticity checking system of the present invention, the authenticity of the authenticity indicator can be accurately checked by making use of the first authenticity recognition function of the authenticity indicator, attributed to the diffracting action of the transmission volume hologram layer, and the second authenticity recognition function of the authenticity indicator, attributed to the polarized-light selectivity of the polarized-light selectively reflecting layer. If an image has been recorded in the transmission volume hologram layer, the relatively bright image reconstructed from the hologram layer can be recognized by the front side light-receiving device.

A second authenticity checking system according to the present invention for checking the authenticity of an authenticity indicator comprising a polarized-light selectively reflecting layer that reflects a specified polarized component of incident light, and a transmission volume hologram layer disposed on front side of the polarized-light selectively reflecting layer, the second authenticity checking system comprises a front side checking unit having a front side light-receiving device that is disposed on the front side of the authenticity indicator and receives, of the incident light on the authenticity indicator, light that has emerged from the authenticity indicator to the front side, wherein the front side checking unit is configured to check the authenticity of the authenticity indicator based on data on the light received by the front side light-receiving device; and a rear side checking unit having a rear side light-receiving device that is disposed on rear side of the authenticity indicator and receives, of the incident light on the authenticity indicator, light that has emerged from the authenticity indicator to the rear side, wherein the rear side checking unit is configured to check the authenticity of the authenticity indicator based on data on the light received by the rear side light-receiving device.

According to this second authenticity checking system of the present invention, the authenticity of the authenticity indicator can be checked accurately by making use of the first authenticity recognition function of the authenticity indicator, attributed to the diffracting action of the transmission volume hologram layer, and the second authenticity recognition function of the authenticity indicator, attributed to the polarized-light selectivity of the polarized-light selectively reflecting layer. If an image has been recorded in the transmission volume hologram layer, the relatively bright image reconstructed from the hologram layer can be recognized by the front side light-receiving device or rear side light-receiving device.

The authenticity checking system according to the present invention may further comprise a band pass filter that is disposed on the front side of or the rear of the authenticity indicator so that at least one of following light can enter the band pass filter: light that will enter the authenticity indicator from the front side, light that has emerged from the authenticity indicator to the front side, and light that has emerged from the authenticity indicator to the rear side. The band pass filter is placed so that either the light that will enter the authenticity indicator or the light that has emerged from the authenticity indicator passes through it.

The authenticity checking system according to the present invention may further comprise an absorption polarizer that is disposed on the front side of or the rear side of the authenticity indicator so that at least one of following light can enter the absorption polarizer: light that will enter the authenticity indicator from the front side, light that has emerged from the authenticity indicator to the front side, and light that has emerged from the authenticity indicator to the rear side. The absorption polarizer is placed so that either the light that will enter the authenticity indicator or the light that has emerged from the authenticity indicator passes through it.

In the authenticity checking system according to the present invention, the transmission volume hologram layer may have an image recorded therein, and the checking unit may be configured to check the authenticity of the authenticity indicator by confirming whether the image is reconstructed by the light to be received by the light-receiving device or not, or by confirming whether the image is reconstructed by the light to be received by the light-receiving device or not and also observing the brightness of the reconstructed image. According to such an authenticity checking system of the invention, the image recorded in the transmission volume hologram layer can be recognized by the front side light-receiving device placed in front of the authenticity indicator or by the rear side light-receiving device placed at the rear of the authenticity indicator, so that the authenticity of the authenticity indicator can be checked more accurately. Further, by taking the brightness of the reconstructed image into account, the authenticity of the authenticity indicator can be checked with still higher accuracy.

Furthermore, the authenticity checking system according to the present invention may further comprise a light source that emits light on the authenticity indicator from the front side. According to such an authenticity checking system of the invention, the light-receiving device can receive an increased amount of light, so that the authenticity of the authenticity indicator can be checked more accurately. And if the light source is made to emit on the authenticity indicator a specified polarized-light component or light in a specified wavelength range, the authenticity of the authenticity indicator can be checked more accurately.

In this authenticity checking system according to the present invention, the light source may be configured to emit light on the authenticity indicator so that light enters the transmission volume hologram layer from the front side at an angle that meets diffraction condition of the transmission volume hologram layer. According to such an authenticity checking system of the invention, the light emerging from the authenticity indicator can be provided with the properties of polarized light, so that the authenticity of the authenticity indicator can be checked with still higher accuracy by making use of these properties.

Alternatively, in the authenticity checking system according to the present invention, the light source may be configured to emit light on the authenticity indicator so that, after being reflected from the polarized-light selectively reflecting layer, the light enters the transmission volume hologram layer from rear side at an angle that meets diffraction condition of the transmission volume hologram layer. According to such an authenticity checking system of the invention, the light emerging from the authenticity indicator can be provided with the properties of polarized light, so that the authenticity of the authenticity indicator can be checked more accurately by making use of these properties.

According to the authenticity indicator of the present invention, its authenticity can be checked easily and accurately by making use of its first authenticity recognition function attributed to the diffracting action of the transmission volume hologram layer and its second authenticity recognition function attributed to the polarized-light selectivity of the polarized-light selectively reflecting layer. In particular, the authenticity of the authenticity indicator can be checked more accurately by the diffracted light that is relatively bright. In addition, since the transmission volume hologram layer is difficult to be forged, the authenticity indicator of the invention can be said to have an outstanding forgery preventing effect.

DESCRIPTION OF PREFERRED EMBODIMENTS

An embodiment of the present invention will be described hereinafter with reference to the accompanying drawings.

FIGS. 1 to 9 are views showing an embodiment of an authenticity indicators an authenticity checking method, and an authenticity checking system according to the present invention.

[1. Schematic Entire Structure]

Figure 1:
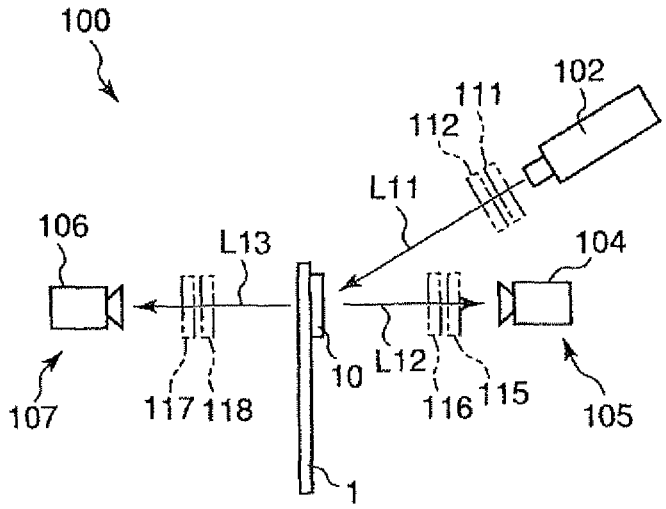
FIG. 1 is a schematic structural view showing an authenticity indicator, an authenticity checking method, and an authenticity checking system, in one embodiment according to the present invention.
Figure 2:
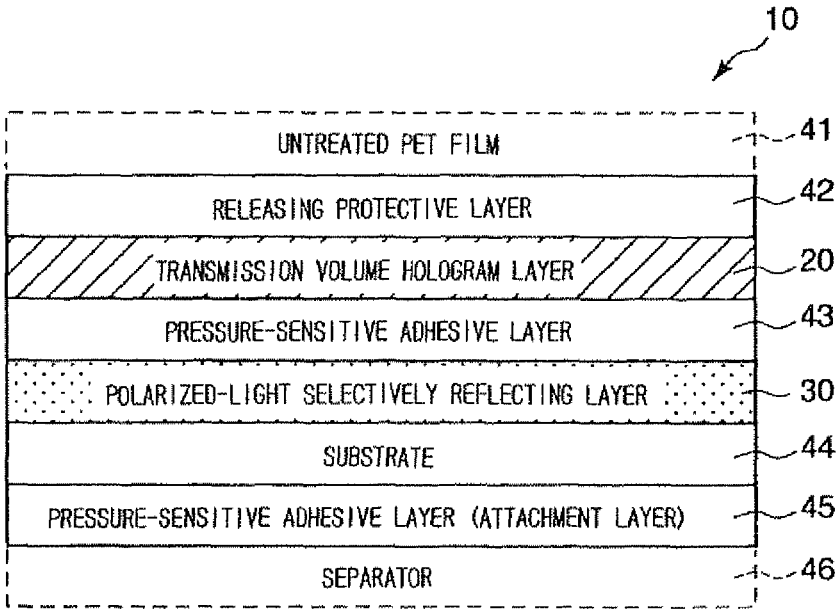
FIG. 2 is a schematic structural view of an authenticity indicator.

The entire structures of an authenticity indicator and an authenticity checking system in this embodiment will be schematically described with reference mainly to FIGS. 1 and 2. FIG. 1 is a schematic structural view showing an authenticity checking method and an authenticity checking system, and FIG. 2 is a schematic structural view of an authenticity indicator. As FIG. 1 shows, an authenticity checking system 100 in this embodiment is for checking the authenticity of an authenticity indicator 10 attached to a genuine article 1. The authenticity checking system 100 comprises a light source (projector, light emitting device) 102 adapted to emit (radiate, project) light on the authenticity indicator 10 from front side (the right-hand side in FIG. 1); a front side checking unit 105 having a front side light-receiving device 104 that is disposed on the front side of the authenticity indicator 10 and receives, of the incident light L11 that entered the authenticity indicator 10, light L12 that has emerged from the authenticity indicator 10 to the front side; a rear side checking unit 107 having a rear side light-receiving device 106 that is disposed on rear side (the left-hand side in FIG. 1) of the authenticity indicator 10 and receives, of the incident light L11 that entered the authenticity indicator10, light L13 that has emerged from the authenticity indicator 10 to the rear side (back side). The front side checking unit 105 is configured to use for checking the authenticity of the authenticity indicator 10 based on data on the light L12 received by the front side light-receiving device 104. The rear side checking unit 107 is configured to use for checking the authenticity of the authenticity indicator 10 based on data on the light L13 received by the rear side light-receiving device 106.

As shown in FIG. 2, the authenticity indicator 10 comprises a polarized-light selectively reflecting layer 30 that reflects a specified polarized component of incident light, and a transmission volume hologram layer 20 laminated, with a pressure-sensitive adhesive layer 43, on the front side (the upper side in FIG. 2) of the polarized-light selectively reflecting layer 30. The authenticity indicator 10 in this embodiment further comprises a releasing protective layer 42 laminated on the front side of the transmission volume hologram layer 20; a substrate 44 for backing the polarized-light selectively reflecting layer 30, disposed on the rear side (the lower side in FIG. 2) of the polarized-light selectively reflecting layer 30; and a pressure-sensitive adhesive layer 45 useful in attaching the authenticity indicator 10 to a genuine article 1, disposed on the rear side of the substrate 44.

The genuine article 1 herein means such an article as a card, a passport, an ID card, a gift certificate, or a specific commodity that should be distinguished from its forgeries, fakes, or the like. In the following description, there will be handled the case where the authenticity indicator 10 is attached to a packaging material or the like for a commodity and the portion of the genuine article 1 to which the authenticity indicator 10 is to be attached is transparent.

[2. Structure of Authenticity Indicator]

The transmission volume hologram layer 20, the polarized-light selectively reflecting layer 30, and the substrate 44, as main constituent layers of the authenticity indicator 10, will be described hereinafter in detail.

[2.1. Structure of Transmission Volume Hologram Layer]

Figure 8:
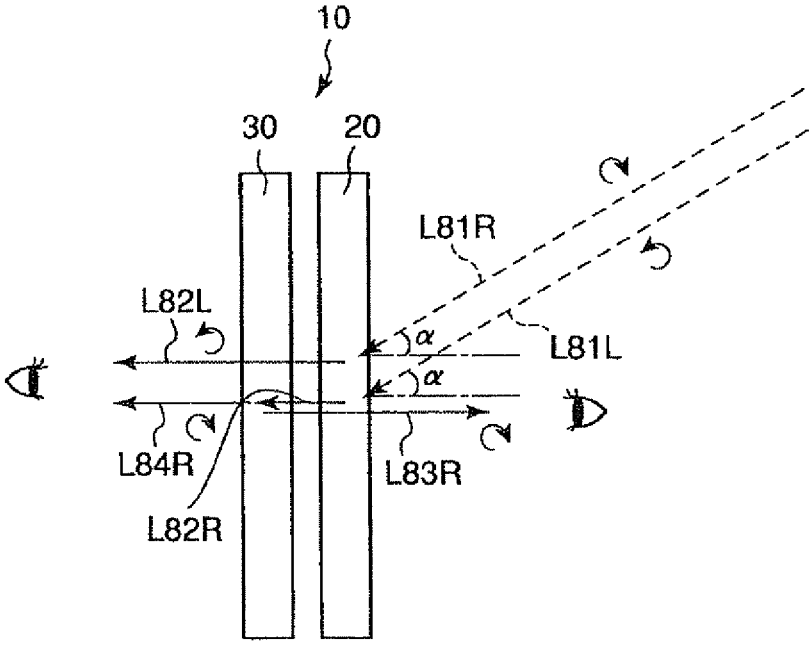
FIG. 8 is an illustration for explaining the optical function of an authenticity indicator.
Figure 10:
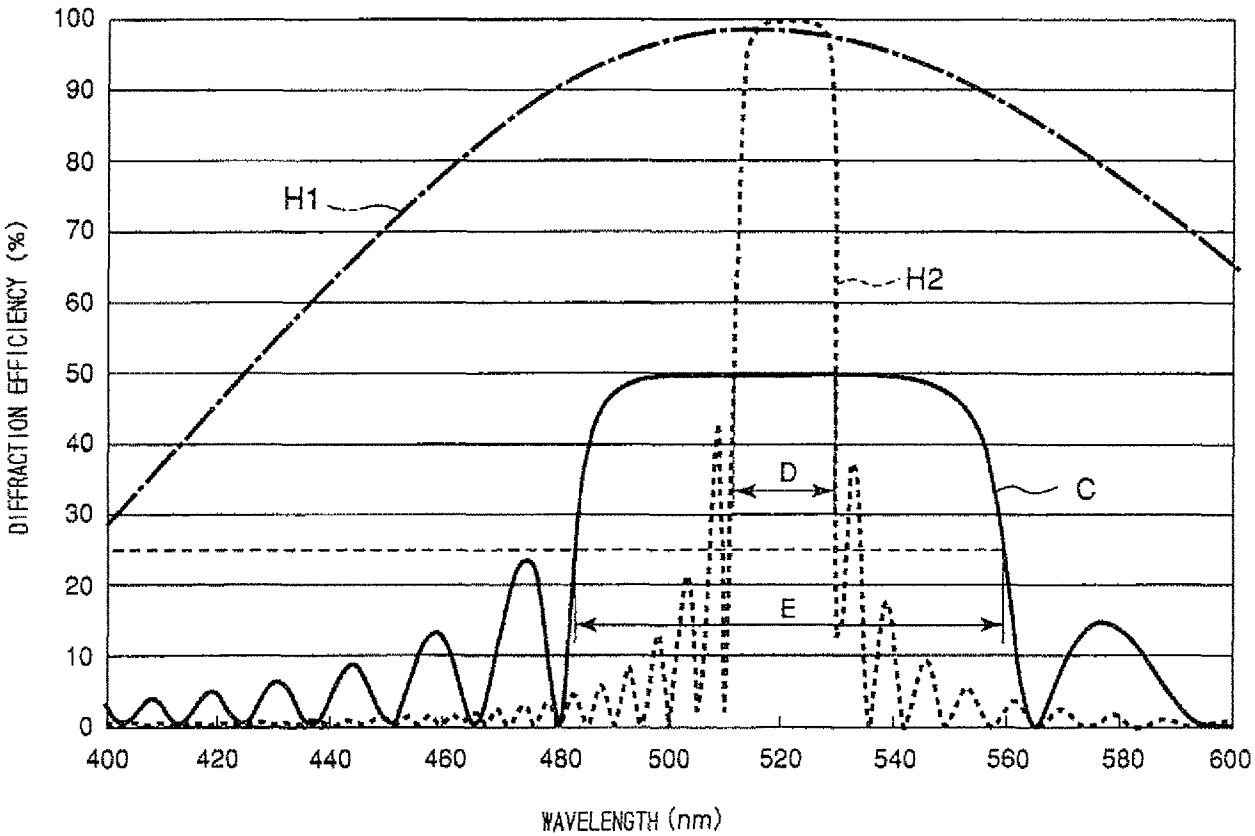
FIG. 10 is a diagram for explaining the wavelength selectivity of a transmission volume hologram, that of a cholesteric liquid crystal, and that of a reflection volume hologram.

The structure of the transmission volume hologram layer will be described in detail with reference mainly to FIGS. 10 and 8. FIG. 10 is a diagram for explaining the wavelength selectivity of a transmission volume hologram, that of a cholesteric liquid crystalline structure, and that of a reflection volume hologram. FIG. 8 is an illustration for explaining the optical function of the authenticity indicator.

The transmission volume hologram layer 20 has interference fringes formed therein, and these interference fringes diffract light incident on the hologram layer at a specified angle. In this embodiment, since an image is recorded in the transmission volume hologram layer 20, the light diffracted by the transmission volume hologram layer 20 can be recognized as the image.

Curve H1 in FIG. 10 shows the relationship between the wavelength (nm) of light incident on a transmission volume hologram and the diffraction efficiency (%) of the transmission volume hologram. Similarly, Curve C in FIG. 10 shows the relationship between the wavelength (nm) of light incident on a cholesteric liquid crystalline structure and the diffraction efficiency (reflection efficiency) (%) of the cholesteric liquid crystalline structure. Further, Curve H2 in FIG. 10 shows the relationship between the wavelength (nm) of light incident on a reflection volume hologram and the diffraction efficiency (reflection efficiency) (%) of the reflection volume hologram. As FIG. 10 shows, a transmission volume hologram has wavelength selectivity and typically diffracts light with a specified wavelength (the center wavelength of a selective diffraction wavelength range) at peak efficiency, and this diffraction efficiency gradually decreases as the wavelength of incident light deviates from the specified wavelength. In general, however, a transmission volume hologram has extremely low sensitivity with regard to wavelength selectivity as compared with a cholesteric liquid crystalline structure and a reflection volume hologram, and the selective diffraction wavelength range of the transmission volume hologram is considerably broad. Namely, a transmission volume hologram shows high diffraction efficiency over a wide wavelength range. The transmission volume hologram, the reflection volume hologram, and the cholesteric liquid crystalline structure shown in FIG. 10 have almost the same selective diffraction center wavelength.

The selective diffraction wavelength range of the transmission volume hologram layer 20 in this embodiment corresponds to the visible light range (e.g., the wavelength range of 400 to 700 nm). This means that the transmission volume hologram layer 20 in this embodiment has the property of diffracting light at high efficiency over the whole visible light range (e.g., the wavelength range of 400 to 700 nm). The selective diffraction wavelength range, however, is not limited to the above one and may be set so that the transmission volume hologram layer 20 selectively diffracts light in a specified wavelength range that covers only part of the visible light range (e.g., the wavelength range of 400 to 700 nm), for example, light in the wavelength ranges for red (R), green (G) and blue (B), the three primary colors of light.

The diffracting action of the transmission volume hologram layer 20 will be described specifically with reference to FIG. 8. As shown in FIG. 8, of the unpolarized light entering the transmission volume hologram layer 20 from the front side (the right-hand side in FIG. 8), the light (e.g., right-handed circularly polarized light L81R and left-handed circularly polarized light L81L) having wavelengths in the selective diffraction wavelength range of the transmission volume hologram layer 20, entering at an angle $\alpha$ that meets the diffraction condition of the transmission volume hologram layer 20 (an angle that meets the Bragg condition of the transmission volume hologram layer), is diffracted by the transmission volume hologram layer 20 independently of its polarized-light component and emerges as diffracted light (L82R, L82L) from the transmission volume hologram layer 20 toward rear side (the left-hand side in FIG. 8). In this embodiment, light that has entered the transmission volume hologram layer 20 from the front side is diffracted approximately vertically to the sheet plane of the authenticity indicator 10 (the transmission volume hologram layer 20), as shown in FIG. 8. Namely, the image formed by the diffracted light can be viewed frontally from the rear side of the transmission volume hologram layer 20. It is noted that light reverses in the sate of polarization (e.g., the direction of circular polarization) when diffracted by the transmission volume hologram layer 20.

The transmission volume hologram layer 20 may have the property of diffusing light. The word "diffuse" herein means that transmitted light is spread or scattered to such an extent that the above-described diffracted light L82R, L82L can be recognized as the image recorded in the transmission volume hologram layer 20.

[2.2. Method for Producing Transmission Volume Hologram Layer]

Figure 4:
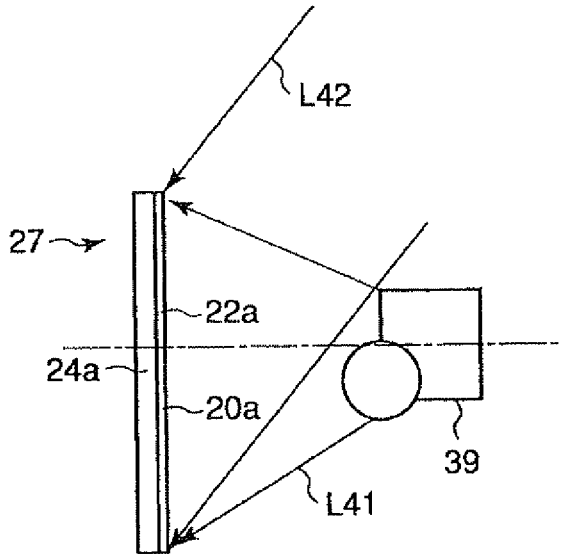
FIG. 4 is a view for explaining a method for mass-producing a transmission volume hologram layer, showing a process for making a first master.
Figure 5:
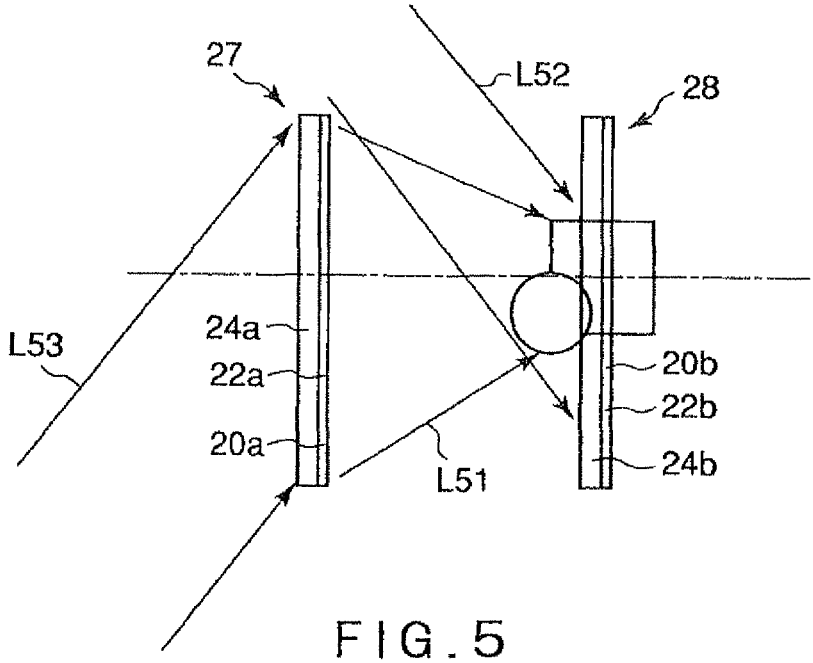
FIG. 5 is a view for explaining a method for mass-producing a transmission volume hologram layer, showing a process for making a second master.
Figure 6:
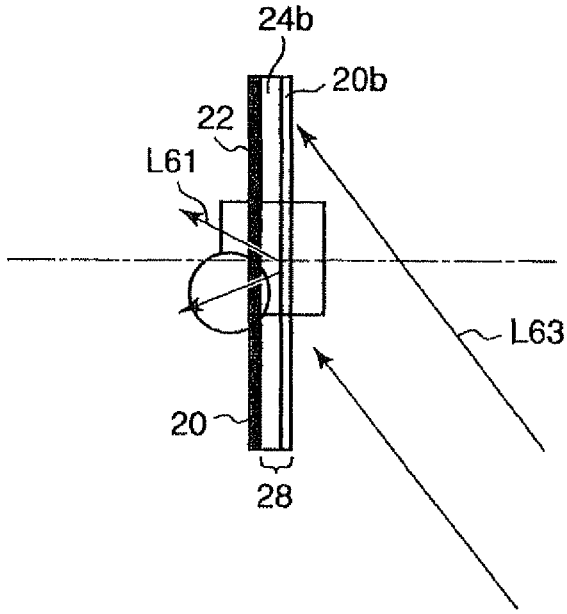
FIG. 6 is a view for explaining a method for mass-producing a transmission volume hologram layer, showing a process for producing a transmission volume hologram layer as a product of mass production.

A method for producing the transmission volume hologram layer will be described with reference mainly to FIGS. 4 to 6. FIGS. 4 to 6 are views for explaining a method for mass-producing the transmission volume hologram layer.

[2.2.1. Recording Method and Method for Mass-producing Transmission Volume Hologram Layer]

First, a method for recording an interference pattern to prepare a transmission volume hologram will be described.

An example of this method is that an interference pattern is recorded to prepare a transmission volume hologram with the necessary elements arranged as shown in FIG. 4. Namely, as shown in FIG. 4, an object light L41 is made to enter, from one side, a holographic photosensitive material 22a made from a photopolymer or the like, and a reference light L42, parallel light, is also made to enter the holographic photosensitive material 22a from the same side (the right-hand side in FIG. 4), thereby causing the object light L41 and the reference light L42 to interfere with each other. The interference pattern to become a transmission volume hologram is thus recorded in the holographic photosensitive material 22a.

In this case, the object light L41 and the reference light L42 are emitted from one light source and are transmitted light or reflected light split by a beam splitter or the like. These two waves L41, L42, therefore, have the same wavelength. The object light L41 and the reference light L42 emitted from the light source are led to the holographic photosensitive material 22a by a mirror or the like. The object light L41 enters the holographic photosensitive material 22a after being reflected from an object 39 whose image is to be recorded in the holographic photosensitive material 22a.

Further, in the method shown in FIG. 4, the holographic photosensitive material 22a is backed by a substrate 24a. Such a material as a plastic film or glass can be used as the substrate 24a. In the case where the object light and the reference light contain only a specified polarized-light component, it is preferable to use, for the substrate 24a, a less birefringent material selected from TAC films, heat-resistant, transparent norbornene resins, cycloolefin polymers, etc. in order not to disturb the state of polarization of the polarized-light component.

A method for mass-producing the transmission volume hologram layer 20 will be described with reference to FIGS. 4 to 7.

First, an object light L41, light reflected from an object 39 whose image is to be recorded, is made to enter the holographic photosensitive material 22a, backed by the substrate 24a, from its front. Simultaneously, a reference light L42, parallel light, is made to enter obliquely the holographic photosensitive material 22a, backed by the substrate 24a, from the same side. A transmission volume hologram layer 20a having the image of the object 39 recorded therein is thus formed on the substrate 24a, and there is obtained a first master 27 having the substrate 24a and the transmission volume hologram layer 20a. In this recording method, it is necessary to place the object 39 so that the object 39 does not block the reference light L42 travelling toward the holographic photosensitive material 22a. Therefore, the object 39 is inevitably placed apart from the holographic photosensitive material 22a.

Next, a reconstruction wave (reconstruction light) L53, a wave conjugated to the reference light L42 shown in FIG. 4, is made to enter the transmission volume hologram layer 20a of the first master 27 via the substrate 24a, as shown in FIG. 5. Since the reconstruction wave L53 meets the diffraction condition of the transmission volume hologram layer 20a of the first master 27, it is diffracted. As a result, the image of the object 39 recorded in the transmission volume hologram layer 20a is reconstructed by the diffracted light L51. As mentioned above, the object 39 is placed apart from the holographic photosensitive material 22a when producing the first master 27. The diffracted light L51 from the transmission volume hologram layer 20a of the first master 27, therefore, forms (reconstructs) the image of the object 39 at a point apart from the transmission volume hologram layer 20a of the first master 27.

As shown in FIG. 5, a holographic photosensitive material 22b for a second master (an original plate for reconstruction) 28, backed by a substrate 24b, is placed at the point at which the reconstruction wave (diffracted light) L51 forms the image of the object 39. Namely, the reconstruction wave (diffracted light) that forms the image of the object 39 is made to enter, as an object light L51, a holographic photosensitive material 22b from one side. Further, a reference light L52, parallel light, is made to enter obliquely the holographic photosensitive material 22b, backed by the substrate 24b, from the same side. A transmission volume hologram layer 20b having the image of the object 39 recorded therein is thus formed on the substrate 24b, and there is obtained a second master 28 having the substrate 24b and the transmission volume hologram layer 20b. When producing such a second master 28, the first master 27 is placed apart from the second master 28, so that the first master 27 never blocks the reference light L52.

Thereafter, a reconstruction wave (reconstruction light) L63, a wave conjugated to the reference light L52 shown in FIG. 5, is made to enter the transmission volume hologram layer 20b of the second master 28, as shown in FIG. 6. Since the reconstruction wave L63 meets the diffraction condition of the transmission volume hologram layer 20b of the second master 28, it is diffracted. As a result, the image of the object 39 recorded in the transmission volume hologram layer 20b is reconstructed by the diffracted light L61. As mentioned above, when producing the second master 28, the holographic photosensitive material 22b is placed near the point at which the image of the object 39 is formed. Therefore, the diffracted light L61 from the transmission volume hologram layer 20b of the second master 28 forms (reconstructs) the image of the object 39 that appears as if the object is present near the point at which the transmission volume hologram layer 20b is positioned.

As shown in FIG. 6, on the surface of the substrate 24b of the second master 28, on the side opposite to the transmission volume hologram layer 20b of the second master 28, is a holographic photosensitive material 22. A reconstruction wave (diffracted light) for forming the image of the object 39 is made to enter the holographic photosensitive material 22 as an object light L61. The diffraction efficiency of the transmission volume hologram layer 20b of the second master 28 is set to approximately 50%, for example, so that part of the reconstruction wave L63 passes through the transmission volume hologram layer 20b without being diffracted. This part of the reconstruction wave L63, not diffracted by the transmission volume hologram layer 20b, enters the holographic photosensitive material 22 as a reference light from the same side as that from which the object light 61 has entered. There is thus formed a transmission volume hologram layer 20 having the image of the object 39 recorded therein. By repeating this procedure using the second master 28, it is possible to mass-produce the transmission volume hologram layer 20 successively.

Figure 7:
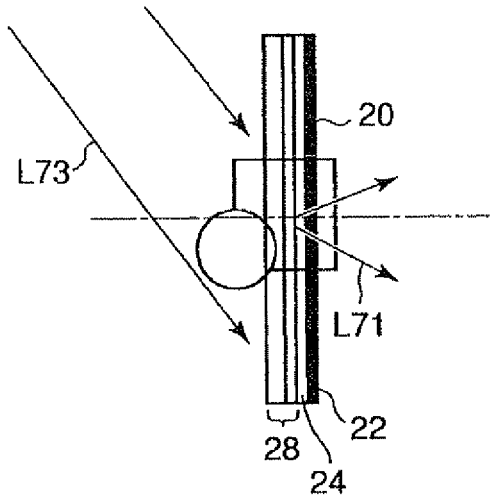
FIG. 7 is a view for explaining a method for mass-producing a transmission volume hologram layer, showing a modification of the process for producing a transmission volume hologram layer as a product of mass production.

The above-described method for mass-producing the transmission volume hologram layer 20 is merely one example, and it may be modified as shown in FIG. 7. FIG. 7 is a view for explaining a method for successively mass-producing a transmission volume hologram layer 20 by the use of a second master (original plate for duplication) 28, and shows a process corresponding to the one shown in FIG. 6. In the process shown in FIG. 6, a wave conjugated to the reference light L52 shown in FIG. 5 is used as the reconstruction wave L63. In the method shown in FIG. 7, on the other hand, light L73 entering the second master 28 from the same direction as that from which the reference light L52 shown in FIG. 5 enters the second master 28 is used as a reconstruction wave. The transmission volume hologram layer 20b of the second master 28 diffracts part of the reconstruction wave L73. As a result, the image of the object 39 recorded in the transmission volume hologram layer 20b is reconstructed by the diffracted light L71. Further, in the example shown in FIG. 7, a holographic photosensitive material 22 backed by a substrate 24 is in contact with and supported by the surface of the substrate 24b of the second master 28, on the same side on which the transmission volume hologram layer 20b of the second master 28 is present, and there is formed a transmission volume hologram layer 20 in which the image of the object 39 has been recorded by the diffracted light 71 and a part of the reconstruction wave L73, not diffracted by the transmission volume hologram layer 20b.

[2.2.2. Transmission Volume Holographic Materials]

Transmission volume holographic materials useful for forming the transmission volume hologram layer 20 will be described in detail.

Conventionally known volume holographic materials can be used as the transmission volume holographic materials. Specific examples of such holographic materials include silver halide sensitive materials, dichromated gelatin, photocrosslinkable polymers, and photopolymers. Of these, photopolymers are superior in mass productivity to the other materials, because preparation of volume holograms using photopolymers demands only dry processes.

Preferably, a photopolymer having at least one photopolymerizable compound and a photopolymerization initiator that will be described below in detail is used as the holographic material.

(1. Photopolymerizable Compound)

Photopolymerizable compounds useful in this embodiment will be described below. Either radically photopolymerizable compounds or cationically photopolymerizable compounds may be used as the photopolymerizable compounds. Explanation of radically photopolymerizable compounds and that of cationically photopolymerizable compounds will be given below separately.

(1.a. Radically Photopolymerizable Compound)

In this embodiment, any compound can be used as the radically photopolymerizable compound as long as it is polymerized by the action of an active radical which a radical photopolymerization initiator that will be described later liberates when irradiated with laser light or the like in the course of preparation of a volume hologram by the use of a volume-hologram-layer-forming resin composition of the present invention, and those compounds having at least one addition-polymerizable, ethylenically unsaturated double bond are herein useful. Examples of such compounds include unsaturated carboxylic acids, unsaturated carboxylates, esters of unsaturated carboxylic acids and aliphatic polyhydric alcohol compounds, and amide-combined products obtained from unsaturated carboxylic acids and aliphatic polyvalent amine compounds. The following are specific examples of the above-described ester monomers of unsaturated carboxylic acids and aliphatic polyhydric alcohol compounds.

Examples of acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylol propane triacrylate, trimethylol propane tri(acryloyloxypropyl)ether, trimethylol ethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomers, 2-phenoxyethylacrylate, phenol ethoxylate monoacrylate, 2-(p-chlorophenoxy)ethyl acrylate, p-chlorophenyl acrylate, phenyl acrylate, 2-phenylethylacrylate, (2-acryloxyethyl)ether of bisphenol A, ethoxylated bisphenol A diacrylate, 2-(1-naphthyloxy)ethyl acrylate, o-biphenyl acrylate, 9,9-bis(4-acryloxydiethoxyphenyl)fluorene, 9,9-bis(4-acryloxytriethoxyphenyl)fluorene, 9,9-bis(4-acryloxydipropoxyphenyl)-fluorene, 9,9-bis(4-acryloxyethoxy-3-methylphenyl)fluorene, 9,9-bis(4-acryloxyethoxy-3-ethylphenyl)fluorene, and 9,9-bis(4-acryloxyethoxy-3,5-dimethyl)fluorene.

Sulfur-containing acrylic compounds may also be used. Examples of such compounds include 4,4'-bis(β-acryloyloxyethylthio)-diphenyl sulfone, 4,4'-bis(β-acryloyloxyethylthio)diphenyl ketone, 4,4'-bis(β-acryloyloxyethylthio)-3,3',5,5'-tetrabromodiphenyl ketone, and 2,4-bis(β-acryloyloxyethylthio)diphenyl ketone.

Examples of methacrylic esters include those compounds which "acrylate", "acryloxy", and "acryloyl" in the above compounds enumerated as examples of acrylic esters are replaced with "methacrylate", "methacryloxy", and "methacryloyl", respectively.

The radically photopolymerizable compounds described above can be used singly, or two or more of them may be used in combination.

(1.b. Cationically Photopolymerizable Compound)

Cationically photopolymerizable compounds useful herein are those compounds that are cationically polymerized by the action of Bronsted or Lewis acids which cationic photopolymerization initiators, that will be described later, liberate when they decompose. Examples of such compounds include cyclic ethers having such rings as epoxy or oxetane ring, thioethers, and vinyl ethers.

Examples of the above-described compounds having epoxy ring include polyalkylene glycol diglycidyl ethers, bisphenol A diglycidyl ether, glycerin triglycidyl ether, diglycerol triglycidyl ether, diglycidyl hexahydrophthalate, trimethyloylpropane diglycidyl ether, allyl glycidyl ether, phenyl glycidyl ether, and cyclohexene oxide.

The above cationically photopolymerizable compounds can be used singly. Alternatively, two or more of them may be used in combination.

Further, one of, or two or more of the above-described radically photopolymerizable compounds may be used in combination with one of, or two or more of the above-described cationically photopolymerizable compounds.

In the preparation of a volume hologram using the above-described volume-hologram-layer-forming resin composition, laser light or the like is applied objective-image-wise to the resin composition to polymerize a radically photopolymerizable compound contained in the resin composition, and energy is then applied entirely to the resin composition to polymerize the uncured materials in it, such as a cationically photopolymerizable compound. Generally, the laser light or the like to be applied to form the image and the energy to be applied entirely to the resin composition are different in wavelength. It is preferred that the cationically photopolymerizable compound for use in the present invention not polymerize when irradiated with laser light or the like that is used for image formation.

Preferably, the cationically photopolymerizable compound is liquid at normal temperatures. This is because it is preferred that the polymerization of the radically polymerizable compound be conducted in a composition having relatively low viscosity.

(1.c. Others)

It is preferable to use the photopolymerizable compound in an amount of 10 to 1,000 parts by weight, preferably 10 to 300 parts by weight, for 100 parts by weight of a binder resin that will be described later.

A transmission volume hologram is a pattern of interference fringes produced by polymerizing a photopolymerizable compound by exposing it to laser light, coherent light, or the like. Therefore, when the volume-hologram-layer-forming resin composition contains both a radically photopolymerizable compound and a cationically photopolymerizable compound, the two compounds are needed to be different in refractive index, and the refractive index of the radically photopolymerizable compound may be either greater or smaller than that of the cationically photopolymerizable compound. From the viewpoint of material selectivity, it is particularly preferred in this embodiment that the radically photopolymerizable compound be greater than the cationically photopolymerizable compound in mean refractive index. Specifically, it is preferred that the mean refractive index of the radically photopolymerizable compound be greater than that of the cationically photopolymerizable compound by 0.02 or more.

This is because when a difference in mean refractive index between the radically photopolymerizable compound and the cationically photopolymerizable compound is less than 0.02, refractive index modulation is unsatisfactory, and it might be difficult to form an extremely fine image. The mean refractive index herein refers to a mean value of measurements of the refractive index of a polymer of a cationically or radically photopolymerizable compound. The refractive index is a value measured with an Abbe refractometer.

(2. Photopolymerization Initiator)

Next, photopolymerization initiators useful in this embodiment will be described. The type of the photopolymerization initiator to be used in this embodiment varies depending on the above-described photopolymerizable compound used. Namely, when a radically photopolymerizable compound is used as the photopolymerizable compound, it is necessary to select a radical photopolymerization initiator for the photopolymerization initiator, and when a cationically photopolymerizable compound is used as the photopolymerizable compound, it is necessary to select a cationic photopolymerization initiator for the photopolymerization initiator. The radical photopolymerization initiator and the cationic photopolymerization initiator will be described below separately.

(2.a. Radical Photopolymerization Initiator)

In this embodiment, any initiator can be used as the radical photopolymerization initiator as long as it liberates an active radical when exposed to laser light or the like in the course of formation of a volume hologram layer using the volume-hologram-layer-forming resin composition, thereby causing polymerization of the radically polymerizable compound. Examples of such radical photopolymerization initiators include imidazole derivatives, bisimidazole derivatives, N-arylglycine derivatives, organic azide compounds, titanocenes, aluminate complexes, organic peroxides, N-alkoxypyridinium salts, and thioxantone derivatives. Specific examples of these initiators include 1,3-di(t-butyldioxycarbonyl)benzophenone, 3,3',4,4'-tetrakis(t-butyldioxycarbonyl)benzophenone, 3-phenyl-5-isooxazolone, 2-mercaptobenzimidazole, bis(2,4,5-triphenyl)imidazole, 2,2-dimethoxy-1,2-diphenylethan-1-one (trade name "Irgacure 651" available from Ciba Specialty Chemicals K.K., Japan), 1-hydroxy-cyclohexyl-phenyl ketone (trade name "Irgacure 184" available from Ciba Specialty Chemicals K.K., Japan), 2-benzyl-2-dimethylamino-1-(4-morpholinophenyl)-butanone-1 (trade name "Irgacure 369" available from Ciba Specialty Chemicals K.K., Japan), and bis(η5-2,4-cyclopentadien-1-yl)-bis(2,6-difluoro-3-(1H-pyrrol-1-yl)-phenyl)titanium (trade name "Irgacure 784" available from Ciba Specialty Chemicals K.K., Japan).

(2.b. Cationic Photopolymerization Initiator)

In this embodiment, any initiator can be used as the cationic photopolymerization initiator as long as it liberates Bronsted or Lewis acid, when energy is applied to it, to cause polymerization of the above cationically photopolymerizable compound. When the volume-hologram-layer-forming resin composition contains both a radically photopolymerizable compound and a cationically photopolymerizable compound, it is preferred that the cationically photopolymerizable compound be not reactive to laser light, coherent light, or the like that causes the above-described radically polymerizable compound to polymerize, but sensitive to energy that is applied to the entire surface of the resin composition layer after the radically polymerizable compound has polymerized. This is because such a cationically photopolymerizable compound can remain substantially unreacted while the radically photopolymerizable compound polymerizes, and this makes the volume hologram finally obtained excellent in refractive index modulation.

Specific examples of cationic photopolymerization initiators useful herein include sulfonic esters, imidosulfonates, dialkyl-4-hydroxy sulfonium salts, p-nitrobenzyl arylsulfonates, silanol-aluminum complexes, and (η6-benzene)(η5-cyclopentadienyl)iron(II). In addition, benzoin tosylate, 2,5-dinitrobenzyltosylate, N-tosyphthalimide, etc. can also be used.

(2.c. Others)

In this embodiment, aromatic iodonium salts, aromatic sulfonium salts, aromatic diazonium salts, aromatic phosphonium salts, triazine compounds, iron-arene complexes, and the like can be used as both the radical photopolymerization initiator and the cationic photopolymerization initiator. Specific examples of these compounds include chlorides or bromides of iodonium such as diphenyl iodonium, ditolyl iodonium, bis(p-t-butylphenyl)iodonium, and bis(p-chlorophenyl)iodonium, iodonium salts of borofluorides, hexafluorophosphates, and hexafluoroantimonates, chlorides or bromides of sulfonium such as triphenylsulfonium, 4-t-butyltriphenylsulfonium, and tris(4-methylphenyl)sulfonium, sulfonium salts of borofluorides, hexafluorophosphates, and hexafluoroantimonates, and 2,4,6-substituted-1,3,5-triazine compounds such as 2,4,6-tris(trichloromethyl)-1,3-5-triazine, 2-phenyl-4,6-bis(trichloromethyl)-1,3,5-triazine, and 2-methyl-4,6-bis(trichloromethyl)-1,3,5-triazine.

The above-enumerated photopolymerization initiators can be used singly. Alternatively, two or more of them may be used in combination.

The photopolymerization initiator is used in an amount of 0.1 to 20 parts by weight, preferably from 5 to 15 parts by weight, for 100 parts by weight of a binder resin that will be described later.

(3. Additives)

Additives that can be added to the volume-hologram-layer-forming resin composition in this embodiment will be described below.

(3.a. Sensitizing Dye)

In this embodiment, it is preferred that a sensitizing dye be contained in the volume-hologram-layer-forming resin composition. The reason for this is as follows: many of the above-described photopolymerizable compounds and photopolymerization initiators are active in ultraviolet light, and if sensitizing dyes are added to them, they become active also in visible light, which makes it possible to record interference fringes by using visible laser light.

Any sensitizing dye can be used although it is necessary to select a proper one with consideration for the wavelength of laser light to be used for recording interference fringes. Examples of sensitizing dyes useful herein include thiopyrylium salt dyes, merocyanine dyes, quinoline dyes, styryl quinoline dyes, coumarin dyes, ketocoumarin dyes, thioxanthene dyes, xanthene dyes, oxonol dyes, cyanine dyes, rhodamine dyes, pyrylium dyes, cyclopentanone dyes, and cyclohexanone dyes.

Specific examples of the above-described cyanine and merocyanine dyes include 3,3'-dicarboxyethyl-2,2'-thiocyanine bromide, 1-carboxymethyl-1'-carboxyethyl-2,2'-quinocyanine bromide, 1,3'-diethyl-2,2'-quinothiacyanine iodide, and 3-ethyl-5-[(3-ethyl-2(3H)-benzo-thiazolidene) ethylidene]-2-thio xo-4-oxazolidine.

Specific examples of the above-described coumarin and ketocoumarin dyes include 3-(2'-benzoimidazol) 7-N,N-diethylamino-coumarin, 3,3'-carbonylbis(7-diethylaminocoumarin), 3,3'-carbonyl-biscoumarin, 3,3'-carbonylbis(5,7-dimethoxycoumarin), and 3,3'-carbonylbis(7-acetoxycoumarin).

In order to ensure high transparency, it is preferable to use a sensitizing dye having an absorption wavelength in the visible light range, which becomes colorless and decomposes when exposed to heat or ultraviolet light in the steps after the step of recording interference fringes. The above-described cyanine dyes are favorably used as such sensitizing dyes.

The sensitizing dye is used in an amount of 0.01 to 10 parts by weight, preferably 0.01 to 2 parts by weight, for 100 parts by weight of a binder resin that will be described below.

(3.b. Binder Resin)

In this embodiment, it is preferred that a binder resin be contained in the volume-hologram-layer-forming resin composition. This is because a volume-hologram-layer-forming resin composition containing a binder resin has improved film-forming properties and can form a layer more uniform in thickness, and, moreover, a layer of such a resin composition can stably retain interference fringes recorded in it.

Examples of such binder resins include polymethacrylate, partially hydrolyzed polymethacrylate, polyvinyl acetate, partially hydrolyzed polyvinyl acetate, polyvinyl alcohol, partially acetalized polyvinyl alcohol, triacetyl cellulose, polyisoprene, polybutadiene, polychloroprene, silicone rubber, polystyrene, polyvinyl butyral, polyvinyl chloride, polyallylate, chlorinated polyethylene, chlorinated polypropylene, poly-N-vinylcarbazole or derivatives thereof, poly-N-vinylpyrrolidone or derivatives thereof, and copolymers of styrene and maleic anhydride or semi-esters thereof. In addition, it is also possible to use copolymers obtained by polymerizing one or more copolymerizable monomers selected from the group consisting of acrylic acid, acrylic esters, methacrylic acid, methacrylic esters, acrylamide, acrylonitrile, ethylene, propylene, vinyl chloride, and vinyl acetate. There may also be used copolymers obtained by polymerizing monomers having, in their side chains, thermosetting or photosetting functional groups. The above-described materials can be used singly. Alternatively, a mixture of two or more of them may also be used.

Curable oligomeric resins can also be used for the binder resin. Examples of such resins useful herein include epoxy compounds obtained by condensation reaction of a variety of phenolic compounds, such as bisphenol A, bisphenol S, novolak, o-cresol novolak, and p-alkylphenol novolak, with epichlorohydrin.

Organic-inorganic hybrid polymers obtained by sol-gel reaction may also be used for the binder resin. Examples of such polymers include copolymers of organometallic compounds having polymerizable groups, represented by the following general formula (1), and vinyl monomers:

$$RmM(OR')n \quad (1)$$

where M is such a metal as Si, Ti, Zr, Zn, In, Sn, Al, or Se, R is a vinyl group having 1 to 10 carbon atoms or (meth)acryloyl group, R' is an alkyl group having 1 to 10 carbon atoms, and m+n shows the valence of the metal M.

Examples of organometallic compounds represented by the general formula (1) in which the metal M is Si include vinyltriethoxysilane, vinyltrimethoxysilane, vinyltributoxysilane, vinyltriallyloxysilane, vinyltetraethoxysilane, vinyltetramethoxysilane, acryloxypropyl-trimethoxysilane, and methacryloxypropyltrimethoxysilane. Examples of the above-described vinyl monomers include acrylic acid, acrylic esters, methacrylic acid, and methacrylic esters.

A volume hologram is prepared by recording interference fringes by way of refractive index or transmittance modulation. It is, therefore, preferred that the difference between the refractive index of the binder resin and that of the photopolymerizable compound be great. In this embodiment, in order to obtain a great difference in refractive index between the binder resin and the photopolymerizable compound, an organometallic compound represented by the following general formula (2) may be added to the volume-hologram-layer-forming resin composition:

$$M(OR'')k \quad (2)$$

where M is such a metal as Ti, Zr, Zn, In, Sn, Al, or Se, R" is an alkyl group having 1 to 10 carbon atoms, and k denotes the valence of the metal M.

If a compound represented by the above general formula (2) is incorporated in the volume-hologram-layer-forming resin composition, it causes sol-gel reaction in the presence of water and an acid catalyst to form a network structure together with the binder resin. Thus, the compound (2) has not only the effect of increasing the refractive index of the binder resin, but also the effect of providing a film of the resin composition with improved toughness and heat resistance. Therefore, in order to obtain a great difference in refractive index between the binder resin and the photopolymerizable compound, it is preferable to use a high-refractive-index metal as the metal M.

The binder resin is used in an amount of usually 15 to 50% by weight, preferably 20 to 40% by weight, of the volume-hologram-layer-forming resin composition.

(4. Other Materials)

As previously mentioned under the heading [2.2.1. Recording Method and Method for Mass-producing Transmission Volume Hologram Layer], when preparing a transmission volume hologram, the above-described volume-hologram-forming resin composition is first applied to a substrate by a conventional coating means, and, if necessary, dried, so as to form a volume holographic layer. Alternatively, a volume holographic layer may be formed by pouring the volume-hologram-layer-forming resin composition in a space between two substrates such as glass plates.

When the above-described volume-hologram-layer-forming resin composition is applied to the substrate, a solvent may be added to it, if necessary. Examples of solvents useful herein include acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, and isopropanol. These solvents may be used either singly or as a mixture of two or more members.

To apply the volume-hologram-layer-forming resin composition to the substrate, such a coating method as spin, gravure, comma, or bar coating may be employed.

The amount of the volume-hologram-layer-forming resin composition to be applied is suitably selected depending on the use or type of the volume hologram layer, and it is typically in the range of 1 to 100 g/m$^2$, preferably in the range of 2 to 40 g/m$^2$. It is preferred that the thickness of the volume holographic layer be usually from 1 to 100 μm, particularly from 2 to 40 μm. Further, it is preferred that the thickness of a volume hologram layer, a cured layer of the volume-hologram-layer-forming resin composition, be generally from 1 to 100 μm, particularly from 10 to 40 μm.

[2.3. Substrate]

The substrate 44 will be described in detail. The substrate 44 is for making the authenticity indicator 10 rigid, and the use of the he substrate 44 can make the handling of the authenticity indicator 10 easy. Preferably, the substrate 44 is highly transparent and less hazy.

A plate or film of such a material as glass or a resin can be used for the substrate 44. Any resin material can be used herein, and there may be used, for example, a thermoplastic polymer selected from polycarbonate polymers, polyester polymers such as polyethylene terephthalate, polyimide polymers, polysulfone polymers, polyether sulfone polymers, polystyrene polymers, polyolefin polymers such as polyethylene and polypropylene, polyvinyl alcohol polymers, cellulose acetate polymers, polyvinyl chloride polymers, polyacrylate polymers, and polymethyl methacrylate polymers.

The transmittance of the substrate 44 can be freely determined, and the substrate 44 may have any transmittance as long as it remains transparent. Moreover, the color of the substrate 44 can also be freely determined, and the substrate 44 may be colored in any color such as red or blue as long as it remains transparent. The color of the substrate 44, therefore, can be selected according, for example, to the color of a genuine article 1 to which the authenticity indicator will be attached. By properly selecting the color of the substrate 44, it is possible to make the authenticity indicator and also the genuine article to which the authenticity indicator is attached more attractive in design.

In order not to disturb the state of polarization of the light that emerges from the rear side of the authenticity indicator after passing through the polarized-light selectively reflecting layer 30, it is preferable to use a thin substrate 44. Further, if the substrate 44 is anisotropic, two sheets of the substrate 44 may be laminated in such a manner that the directions of anisotropy of the sheets cross at right angles, thereby eliminating the influence of double refraction caused by the substrate 44.

[2.4. Structure of Polarized-Light Selectively Reflecting Layer]

Figure 3:
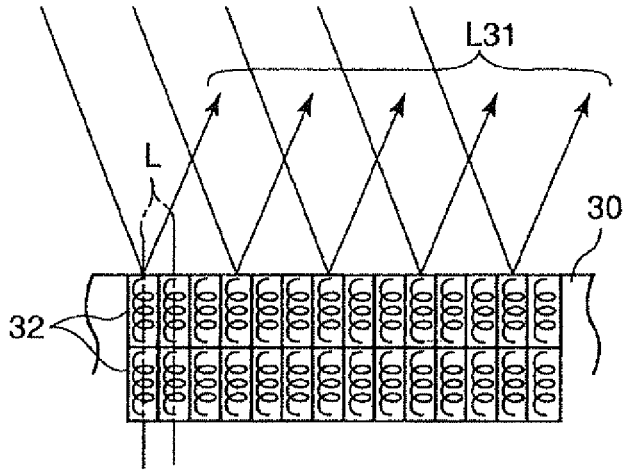
FIG. 3 is an illustration for explaining the state of orientation and optical function of a polarized-light selectively reflecting layer.

The structure of the polarized-light selectively reflecting layer 30 will be described in detail with reference mainly to FIGS. 3 and 8. FIG. 3 is an illustration for explaining the state of orientation and optical function of the polarized-light selectively reflecting layer 30.

The polarized-light selectively reflecting layer 30 is not an absorption polarizing layer which is usually used as a polarizer (polarization plate), but a polarizing layer having the polarized-light separating function of separating incident light into reflected light and transmitted light according to the state of polarization of the incident light. In this embodiment, the polarized-light selectively reflecting layer 30 is made from a cholesteric liquid crystalline composition, and when viewed from the physical alignment (physical structure) of liquid crystalline molecules, it has a helical structure brought about by the continuous rotation of the directors of liquid crystalline molecules in the direction of the thickness of the layer.

Owing to such a physical alignment of liquid crystalline molecules, the polarized-light selectively reflecting layer 30 has polarized-light-separating properties, the property of reflecting a component circularly polarized in one direction and transmitting the other light. Namely, unpolarized light that has entered the polarized-light selectively reflecting layer 30 along the helical axis is split into light to be reflected and light to be transmitted. This phenomenon is known as circular dichroism. If the direction of helical turn in the helical structure consisting of liquid crystalline molecules is properly selected, a component circularly polarized in the same direction as this direction of helical turn is selectively reflected.

In this case, the scattering of polarized light peaks at the wavelength $\lambda_0$ given by the following equation (1):

$$\lambda_0 = nav \cdot p \tag{1}$$

where p is the helical pitch in the helical structure consisting of liquid crystalline molecules (the length of one liquid crystalline molecular helix), and nav is the mean refractive index in a plane perpendicular to the helical axis.

On the other hand, the width $\Delta\lambda$ of the wavelength band of the reflected light is given by the following equation (2):

$$\Delta\lambda = \Delta n \cdot p \tag{2}$$

where $\Delta n$ is the value of birefringence.

Namely, in FIG. 8, of the unpolarized light (including right-handed circularly polarized light L82R and left-handed circularly polarized light L82L, for example) entering the polarized-light selectively reflecting layer 30 from the front side (the right-hand side in FIG. 8), a circularly polarized-light component in the wavelength range (selective reflection wavelength range) with the selective reflection center wavelength $\lambda_0$ and the wavelength band width $\Delta\lambda$ (e.g., right-handed circularly polarized light L83R in the selective reflection wave range) is reflected, and the other light (e.g., left-handed circularly polarized light L82L in and not in the selective reflection wavelength range, and right-handed circularly polarized light L84R not in the selective reflection wavelength range) is transmitted, owing to the above-described polarized-light-separating properties (polarized-light selectivity).

A cholesteric liquid crystalline structure has wavelength selectivity as described above. As shown in FIG. 10, a curve representing the degree of the wavelength selectivity of a cholesteric liquid crystalline structure is sharper than that representing the degree of the wavelength selectivity of the above-described transmission volume hologram layer, but is considerably broader than that representing the degree of the wavelength selectivity of a reflection transmission hologram. Moreover, as for the full width (at) half maximum (FWHM), the width of a wavelength range in which the quantity of the reflected light is a half or more of the maximum quantity, in other words, the width of a wavelength range in which the diffraction efficiency is a half (cholesteric liquid crystalline structure: approximately 25%, reflection volume hologram: approximately 50%) or more of the maximum diffraction efficiency (cholesteric liquid crystalline structure: approximately 50%, reflection volume hologram: approximately 100%), the full width (at) half maximum E in the cholesteric liquid crystalline structure is more than two times the full width (at) half maximum D in the reflection volume hologram. For this reason, when light with wavelengths covering a wide wavelength range has entered the cholesteric liquid crystalline structure, the total quantity of the light reflected from the cholesteric liquid crystalline structure is much greater than that of the light reflected from the reflection volume hologram.

Further, as shown in FIG. 3, the cholesteric liquid crystalline structure of the polarized-light selectively reflecting layer 30 in this embodiment is in the state of planar orientation. Therefore, all of the helical axes L in the helical structure portions 32 of the cholesteric liquid crystalline structure extend in parallel in the direction of the thickness of the layer, and light that the polarized-light selectively reflecting layer 30 selectively reflects (reflected light L31) is reflected by specular reflection.

Figure 11:
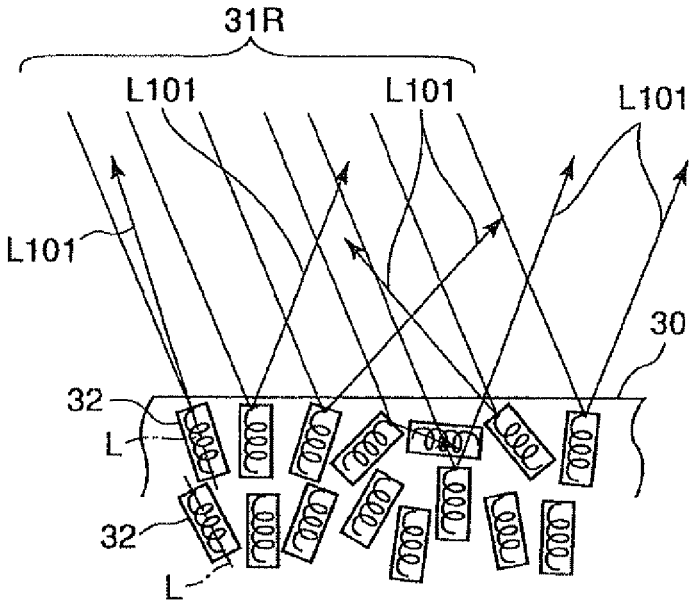
FIG. 11 is an illustration for explaining another state of orientation and optical function of a polarized-light selectively reflecting layer.

However, the polarized-light selectively reflecting layer 30 may be provided with light-diffusing properties. In this case, the polarized-light selectively reflecting layer 30 is formed so that its cholesteric liquid crystalline structure has a plurality of helical structure portions 32 whose helical axes L extend in different directions, as shown in FIG. 11. Owing to such structural non-uniformity of the cholesteric liquid crystalline structure, the polarized-light selectively reflecting layer 30 can diffuse light which the layer selectively reflects (reflected light L101). The state that a cholesteric liquid crystalline structure is structurally non-uniform herein includes the state that the helical axes L in the helical structure portions 32 of a cholesteric liquid crystalline structure extend in different directions, the state that at least some of the nematic layer planes (planes on which the directors of liquid crystalline molecules point in the same X-Y direction) are not parallel to the plane of the polarized-light selectively reflecting layer 30 (the state that, in a sectional TEM photo of a cholesteric liquid crystalline specimen that has been stained, continuous curves that appear as light-and-dark patterns are not parallel to the substrate plane), and the state that finely divided particles of a cholesteric liquid crystal are dispersed, as a pigment, in the polarized-light selectively reflecting layer. The "diffusion" that is caused by such structural non-uniformity of a cholesteric liquid crystalline structure is that incident light is spread or scattered to such an extent that the diffracted light L82R, L82L (see FIG. 8) previously described under the heading [2.1. Structure of Transmission Volume Hologram Layer] can be recognized as the image recorded in the transmission volume hologram layer 20.

The helical structure portions 32 of the cholesteric liquid crystalline structure of the polarized-light selectively reflecting layer 30 may have a specified helical pitch so that the polarized-light selectively reflecting layer 30 selectively reflects light in a specified wavelength range that covers only part of the visible light range (e.g., a wavelength range of 400 to 700 nm). Specifically, in order to make the polarized-light selectively reflecting layer 30 selectively reflect green (G) light, the helical pitch in the cholesteric liquid crystalline structure is determined so that light having wavelengths in a selective reflection wavelength range with a center wavelength of 540 to 570 nm, entering the polarized-light selectively reflecting layer 30 vertically to it, is selectively reflected from the layer. In this case, it is preferred that the width of the wavelength band (selective reflection wavelength range) be from 60 to 100 nm around the selective reflection center wavelength.

Similarly, by determining the helical pitch in the cholesteric liquid crystalline structure so that light having wavelengths in a selective reflection wavelength range with a center wavelength of 430 to 460 nm is selectively reflected, it is possible to make the polarized-light selectively reflecting layer 30 reflect blue (B) light. Further, by determining the helical pitch in the cholesteric liquid crystalline structure so that light having wavelengths in a selective reflection wavelength range with a center wavelength of 580 to 620 nm is selectively reflected, it is possible to make the polarized-light selectively reflecting layer 30 reflect red (R) light. Namely, by properly controlling the helical pitch in the cholesteric liquid crystalline structure, it is possible to make the polarized-light selectively reflecting layer 30 selectively reflect light of the desired color only.

It is preferable to form the polarized-light selectively reflecting layer 30 so that the reflecting layer 30 has such a thickness that the reflecting layer 30 reflects nearly 100% of the light in a specified state of polarization to be selectively reflected (or such a thickness that the reflectance of the polarized-light selectively reflecting layer 30 is maximized). This is because if the polarized-light selectively reflecting layer 30 has a reflectance of less than 100% for a specified polarized-light component which the reflecting layer 30 selectively reflects (e.g., right-handed circularly polarized light), the reflecting layer 30 cannot efficiently reflect the light incident on the reflecting layer 30. Although the reflectance of the polarized-light selectively reflecting layer 30 depends directly on the number of helical turns, the reflectance depends indirectly on the thickness of the polarized-light selectively reflecting layer 30 if the helical pitch is fixed. Specifically, since it is said that about 4 to 8 helical turns are needed for obtaining a reflectance of 100%, a polarized-light selectively reflecting layer 30 for reflecting light in the wavelength range for red (R), green (G), or blue (B), for example, needed to have a thickness of approximately 1 to 10 μm although it varies depending on the type of the ingredients of the liquid crystalline composition and on the selective reflection wavelength range. It is not true that a polarized-light selectively reflecting layer 30 with a greater thickness is, better. This is because, if the polarized-light selectively reflecting layer 30 has an excessively great thickness, its orientation (alignment) is difficult to control, it tends to be non-uniform in thickness, and the material itself for it absorbs light to a great extent. The above-described range of thickness is therefore desirable.

The cholesteric liquid crystalline structure of the polarized-light selectively reflecting layer 30 has the optical property that the selective reflection wavelength range of the layer is shifted to the shorter wavelength side (so-called "blue shift") if light enters the layer obliquely. It is therefore preferable to control properly the helical pitch in the cholesteric liquid crystalline structure according to the angle at which light enters the polarized-light selectively reflecting layer 30.

Besides a cholesteric liquid crystalline polarized-light-separating film, a polarized-light-separating film obtained by laminating two or more films having different refractive indexes (e.g., a multilayer film (D-BEF) manufactured by 3M Limited), or the like can be used as the polarized-light selectively reflecting layer 30. A polarized-light selectively reflecting layer composed of such a polarized-light-separating film or the like has the function of separating two linearly polarized-light components whose axes of polarization cross at right angles.

[2.5. Process for Forming Polarized-Light Selectively Reflecting Layer]

A process for forming the polarized-light selectively reflecting layer 30 will be described below in detail.

The above-described polarized-light selectively reflecting layer 30 can be laminated (fixed) to the substrate 44 by conducting a series of steps (the steps of application, orientation, and curing) that will be described below.

(Step of Application)

A cholesteric chiral nematic liquid crystal or a cholesteric liquid crystal can be used in the liquid crystalline composition to be applied to the substrate 44. Any liquid crystalline material may be used as long as it can develop a cholesteric liquid crystalline structure. In order to obtain an optically-stable cured polarized-light selectively reflecting layer 30, it is particularly preferable to use a polymerizable liquid crystalline material having, at both ends of its molecule, polymerizable functional groups.

A process for forming the polarized-light selectively reflecting layer 30 will be described with reference to the case where a chiral nematic liquid crystal is used in the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material and also for making the liquid crystalline composition cholesteric as a whole. In the liquid crystalline composition, a photopolymerization initiator and some other suitable additives are incorporated.

Examples of polymerizable, nematic liquid crystalline materials include compounds represented by the following general formula (3) and the compounds of the following formulas (4-i) to (4-xi). These compounds may be used either singly or in combination.

(3)

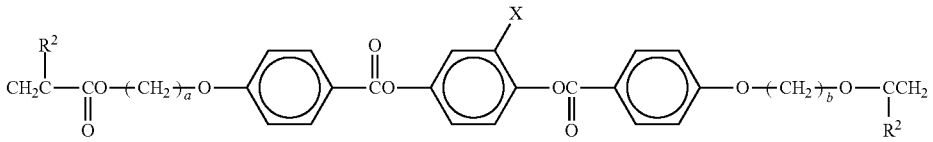

(4-i)

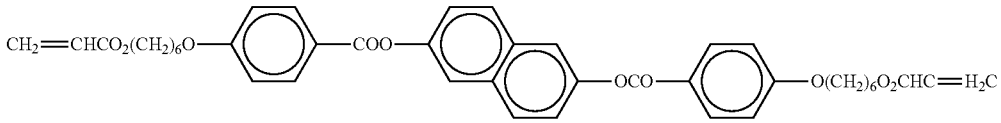

(4-ii)

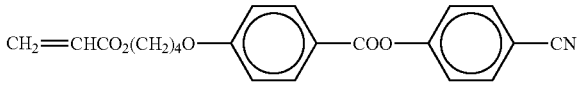

(4-iii)

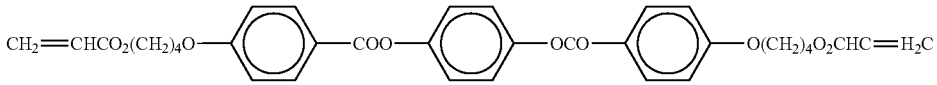

(4-iv)

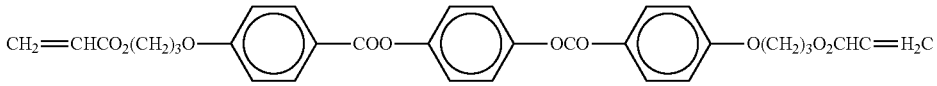

(4-v)

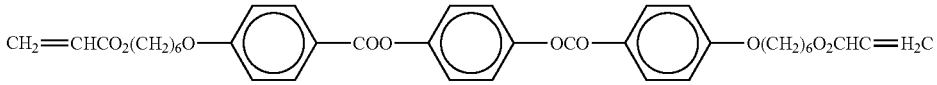

(4-vi)

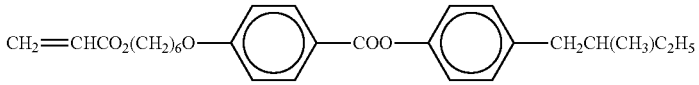

(4-vii)

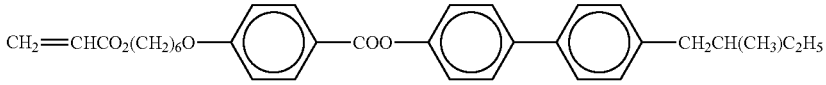

(4-viii)

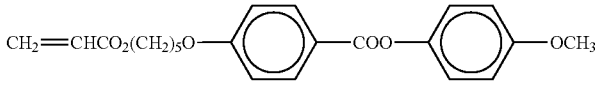

(4-ix)

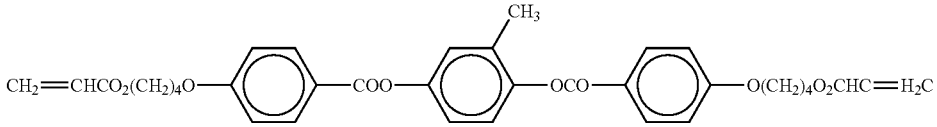

(4-x)

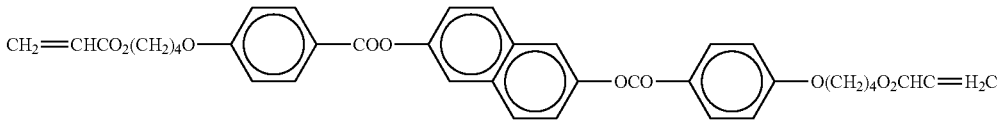

-continued (4-xi)

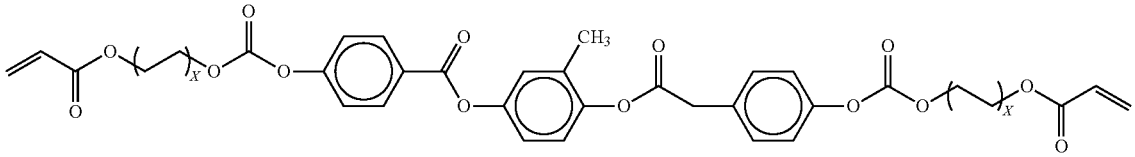

$X$ = an integer of 2 to 5

In the above general formula (3), R1 and R2 independently represent hydrogen or methyl group. It is preferred that both R1 and R2 be hydrogen because compounds of the general formula (3) in which R1 and R2 represent hydrogen present a liquid crystal phase at temperatures in a wider temperature range. Although X may be any of hydrogen, chlorine, bromine, iodine, an alkyl group having 1 to 4 carbon atoms, methoxy group, cyano group, and nitro group, it is preferably chlorine or methyl group. Further, in the above general formula (3), a and b that denote the chain lengths of the alkylene groups serving as spacers between the (meth)acryloyloxy groups at both ends of the molecule and the aromatic rings are independently an integer of 2 to 12, preferably an integer of 4 to 10, and more preferably an integer of 6 to 9. Compounds of the general formula (3) in which a and b are zero are unstable, easily undergo hydrolysis, and have high crystallinity. On the other hand, compounds of the general formula (3) in which a and b independently represent an integer of 13 or more have low isotropic transition temperatures (TI's). Therefore, the compounds of these two types present liquid crystal phases at temperatures in a narrow temperature range and are thus undesirable.

Although a polymerizable liquid crystal monomer is used as the polymerizable, nematic liquid crystalline material in the above description, it is also possible to use a polymerizable liquid crystal oligomer or polymer, a liquid crystal polymer, or the like, which may be suitably selected from conventionally proposed ones.

On the other hand, the chiral agent is a low-molecular weight compound having an optically active site, and its molecular weight is typically 1,500 or less. The main purpose of the chiral agent is to convert the positive mono-axially-nematic structure of a polymerizable, nematic liquid crystalline material into a helical structure. Any purposive low-molecular weight compound may be used as the chiral agent as long as it is compatible with the polymerizable, nematic liquid crystalline material in the state of solution or melt and can cause formation of the desired helical structure in the nematic liquid crystalline material without impairing the liquid crystallinity of the material.

The chiral agent to be used to cause formation of a helical structure in a liquid crystal is needed to have any type of chirality in its molecule. Examples of chiral agents useful herein include those compounds having one, or two or more asymmetric carbon atoms, those compounds having asymmetric centers on hetero atoms, such as chiral amines or sulfoxides, and those axially chiral compounds having optically active sites, such as cumulene and binaphthol. More specific examples of chiral agents include commercially available chiral nematic liquid crystals (e.g., a chiral dopant liquid crystal "S-811" manufactured by Merck KGaA, Germany).

However, depending on the nature of the chiral agent selected, the following problems can occur: the nematic state of the polymerizable, nematic liquid crystalline material is destroyed, and the polymerizable, nematic liquid crystalline material loses its alignability; and, if the chiral agent is non-polymerizable, the liquid crystalline composition has reduced hardenability and the cured film of the liquid crystalline composition is less reliable. Moreover, the use of a large amount of a chiral agent having an optically active site increases the cost of the liquid crystalline composition. Therefore, to form a cholesteric, polarized-light selectively reflecting layer with a short helical pitch, it is preferable to select, as the optically-active-site-containing chiral agent to be incorporated in the liquid crystalline composition, a chiral agent whose effect of causing formation of a helical structure is great. Specifically, it is preferable to use any of the compounds represented by the following general formulae (5), (6), and (7), which are low-molecular weight compounds having axially chiral molecules.

(5)

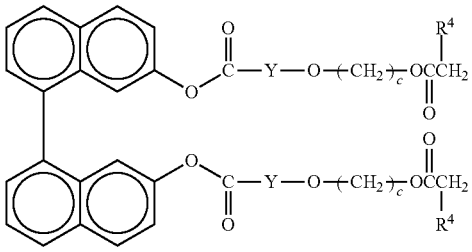

(6)

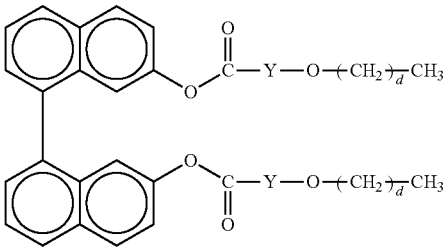

-continued
(7)
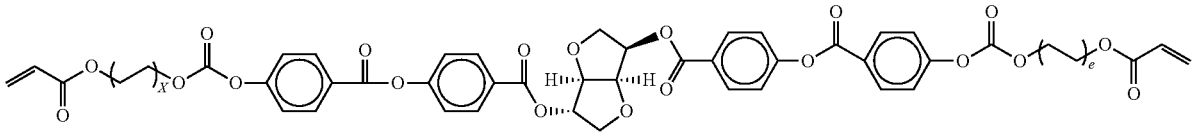
$e$ = an integer of 2 to 5
(i)
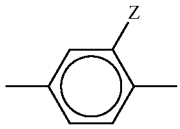
(ii)
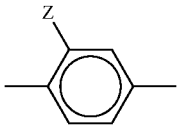
(iii)
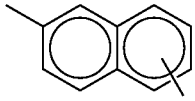
(iv)
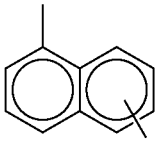
(v)
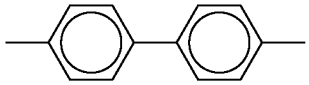
(vi)
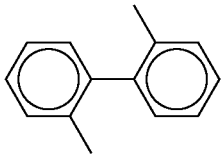
(vii)
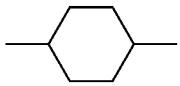
(viii)
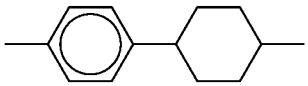
(ix)
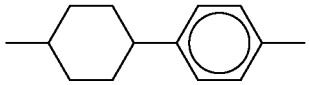
(x)
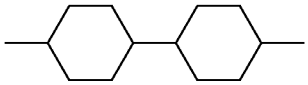
(xi)
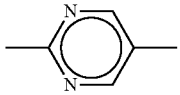
(xii)
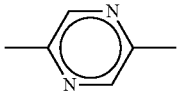
(xiii)
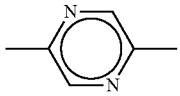
(xiv)
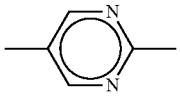
(xv)
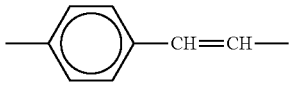
(xvi)
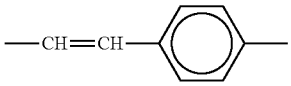
(xvii)
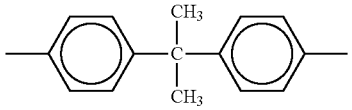
(xviii)
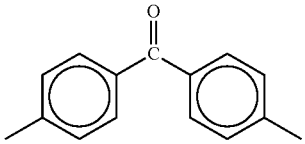
(xix)
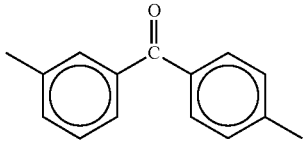
(xx)
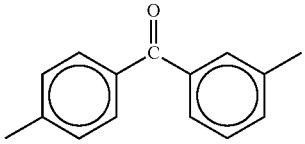
(xxi)
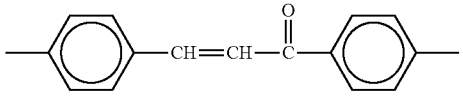
(xxii)
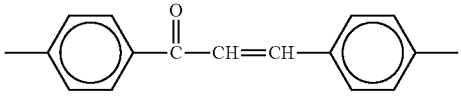

-continued (xxiii)

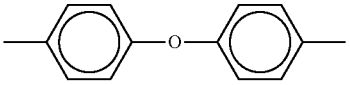

(xxiv)

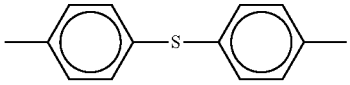

In the above general formulae (5) and (6), R4 represents hydrogen or methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Compounds of the above general formula (5) or (6) in which c or d is 0 or 1 are poor in stability, easily undergo hydrolysis, and have high crystallinity. On the other hand, compounds of the general formula (5) or (6) in which c or d is 13 or more have low melting points (Tm's). These compounds are less compatible with the polymerizable, nematic liquid crystalline material, so that a liquid crystalline composition containing such a compound may cause phase separation depending on the concentration of the compound.

The chiral agent is not needed to be polymerizable. However, if polymerizable, the chiral agent polymerizes with the polymerizable, nematic liquid crystalline material to stably fix the cholesteric structure. It is therefore highly desirable that the chiral agent be polymerizable when the thermal stability, etc. of the polarized-light selectively reflecting layer 30 are taken into consideration. In order to obtain a polarized-light selectively reflecting layer 30 excellent in heat resistance, it is particularly preferable to use a chiral agent having, at both ends of its molecule, polymerizable functional groups.

The content of the chiral agent in the liquid crystalline composition is optimally decided with consideration for the effect of causing formation of a helical structure that the chiral agent has, the cholesteric liquid crystalline structure of the polarized-light selectively reflecting layer finally obtained, and so forth. Specifically, the amount of the chiral agent is usually from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition, although it varies greatly depending upon the ingredients of the liquid crystalline composition. When the amount of the chiral agent added is less than the above range, there is a possibility that the liquid crystalline composition might not become fully cholesteric. On the other hand, when the amount of the chiral agent added exceeds the above-described range, the orientation of liquid crystalline molecules is impeded, which may adversely affect the curing of the liquid crystalline composition in activating radiation or the like. Although the liquid crystalline composition can be applied as it is to the substrate 44, it may be dissolved in a suitable solvent, such as an organic solvent, to give ink in order to make the viscosity of the liquid crystalline composition fit for an applicator, or to achieve excellent orientation of liquid crystalline molecules.

Although any solvent can be used for the above purpose as long as it can dissolve the above-described polymerizable liquid crystalline material, one that does not attack the substrate 44 is preferred. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. The polymerizable liquid crystalline material may be diluted with the solvent to any degree. However, since a liquid crystal itself is a material having low solubility and high viscosity, it is preferable to dilute the polymerizable liquid crystalline material with the solvent to about 5 to 50%, more preferably about 10 to 30%.

(Step of Orientation)

After applying the liquid crystalline composition to the substrate 44 to form thereon a polarized-light selectively reflecting layer 30 in the above-described step of application, the polarized-light selectively reflecting layer 30 is held, in the step of orientation, at a specified temperature at which it develops a cholesteric liquid crystalline structure, thereby aligning liquid crystalline molecules in the polarized-light selectively reflecting layer 30.

As mentioned previously, the cholesteric liquid crystalline structure of the polarized-light selectively reflecting layer 30 in this embodiment is in the state of planar orientation (see FIG. 3). However, a plurality of the helical structure portions of the cholesteric liquid crystalline structure may also be different in the direction of the helical axis L (see FIG. 11). In either case, it is necessary to carry out orientation treatment. Namely, in the former case, it is necessary to conduct not only orientation treatment for producing a plurality of helical structure portions 32 in the cholesteric liquid crystalline structure, but also orientation treatment for pointing, in a certain direction on the substrate 44, the directors of the liquid crystalline molecules constituting the cholesteric liquid crystalline structure. On the other hand, in the latter case, it is necessary to conduct orientation treatment for producing a plurality of helical structure portions 32 in the cholesteric liquid crystalline structure.

The polarized-light selectively reflecting layer 30 formed on the substrate 44 shows a liquid crystal phase when held at a specified temperature at which the polarized-light selectively reflecting layer 30 becomes cholesteric liquid crystalline, and has a helical structure brought about by the continuous rotation of the directors of liquid crystalline molecules in the direction of the thickness of the layer that occurs due to the self-accumulating action of the liquid crystalline molecules themselves. Further, in the case where the polarized-light selectively reflecting layer 30 is made non-diffusive, the directors of the liquid crystalline molecules constituting the cholesteric liquid crystal structure are pointed in a certain direction on the substrate 44. This cholesteric liquid crystalline structure in the state of a liquid crystal phase can be fixed by curing the polarized-light selectively reflecting layer 30 in such a manner as will be described later.

When the liquid crystalline composition applied to the substrate 44 contains a solvent, the step of orientation is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time is preferably from 15 to 600 seconds, more preferably from 30 to 180 seconds.

After the drying treatment, if it is found that the liquid crystal layer is not satisfactorily orientated, it may be heated for a further suitable seconds. If the drying treatment is carried out by vacuum drying, it is preferable to conduct heat treatment separately in order to align the liquid crystalline molecules.

(Step of Curing)

After aligning the liquid crystalline molecules in the polarized-light selectively reflecting layer 30 in the above-described step of orientation, the polarized-light selectively reflecting layer 30 is cured in the step of curing, thereby fixing the cholesteric liquid crystalline structure that has been developed in the state of a liquid crystal phase.

The step of curing can be performed by (1) a method in which the solvent contained in the liquid crystalline composition is dried (evaporated), (2) a method in which the liquid crystalline molecules in the liquid crystalline composition are thermally polymerized, (3) a method in which the liquid crystalline molecules in the liquid crystalline composition are polymerized by means of radiation, or (4) any combination of the above methods.

Of the above-described methods, the method (1) is suitable for the case where a liquid crystal polymer is used as the polymerizable, nematic liquid crystalline material to be incorporated in the liquid crystalline composition for forming the polarized-light selectively reflecting layer 30. In this method, the liquid crystal polymer dissolved in such a solvent as an organic solvent is applied to the substrate 44, and in this case, a solidified polarized-light selectively reflecting layer 30 that is cholesteric can be obtained by merely removing the solvent by drying. The type of the solvent, the drying conditions, etc. may be the same as those in the aforementioned steps of application and orientation.

The above-described method (2) is that the polarized-light selectively reflecting layer 30 is cured by thermally polymerizing the liquid crystalline molecules in the liquid crystalline composition. In this method, the state of bonding of the liquid crystalline molecules varies according to heating (baking) temperature. Therefore, when the polarized-light selectively reflecting layer 30 is heated, if its plane has non-uniformity in temperature, the cured layer cannot be uniform in physical properties such as film hardness and also in optical properties. In order to limit variations in film hardness to ±10%, it is preferable to limit variations in the temperature of the plane of the polarized-light selectively reflecting layer heated, to ±5%, more preferably to ±2%.

Any method can be used to heat the polarized-light selectively reflecting layer 30 formed on the substrate 44 as long as it can make the polarized-light selectively reflecting layer plane uniform in temperature, and there may be employed, for example, a method in which the polarized-light selectively reflecting layer 30 is brought into close contact with a hot plate and held as it is, or is placed on a hot plate with a thin air layer between the polarized-light selectively reflecting layer and the hot plate. Besides, there may be employed a method in which the polarized-light selectively reflecting layer 30 is placed in or passed through a heater capable of entirely heating a particular space, such as an oven. If a film coater or the like is used, it is preferable to make the drying zone long enough to make the heating time sufficiently long.

The heating temperature required is usually as high as 100° C. or more. It is however preferable to limit this temperature to below 150° C. if the heat resistance of the substrate 44 is taken into consideration. If a special film or the like having significantly high heat resistance is used as the substrate 44, it may be heated to a temperature as high as above 150° C.

The above-described method (3) is that the polarized-light selectively reflecting layer 30 is cured by photopolymerizing the liquid crystalline molecules in the liquid crystalline composition in radiation. In this method, an electron beam, ultraviolet light, or the like fit for the conditions can be used as the radiation. In general, ultraviolet light is preferred because of the simplicity of an ultraviolet light irradiation system, and so forth, and its wavelength is from 250 to 400 nm. If ultraviolet light is used, it is preferable to incorporate a photopolymerization initiator in the liquid crystalline composition in advance.

Examples of photopolymerization initiators that may be incorporated in the liquid crystalline composition include benzyl(bibenzoyl), benzoin isobutyl ether, benzoin isopropyl ether, benzophenone, benzoyl benzoic acid, benzoyl methylbenzoate, 4-benzoyl-4'-methyldiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. In addition to photopolymerization initiators, sensitizers may be added to the liquid crystalline composition unless they impair the properties essential for the polarized-light selectively reflecting layer 30.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

[3. Method for Producing Authenticity Indicator]

A method for producing an authenticity indicator 10 in this embodiment will be described with reference mainly to FIG. 9.

As mentioned above, the authenticity indicator 10 in this embodiment, shown in FIG. 2, comprises a releasing protective layer 42, a transmission volume hologram layer 20, a pressure-sensitive adhesive layer 43, a polarized-light selectively reflecting layer 30, a substrate 44, and a pressure-sensitive adhesive layer (attachment layer) 45 that are laminated in the order mentioned, the releasing protective layer 42 being the outermost layer on the front of the authenticity indicator 10. The authenticity indicator 10, when it is not yet attached to a genuine article 1—for example, when the authenticity indicator 10 is stored by its manufacturer, or when the authenticity indicator 10 is delivered from its manufacturer to user—has an untreated PET film 41 laminated to the front side of the releasing protective layer 42, and a separator 46 attached to the rear side (back side) of the pressure-sensitive adhesive layer (attachment layer) 45, as shown in FIG. 2 by broken lines.

Figure 9:
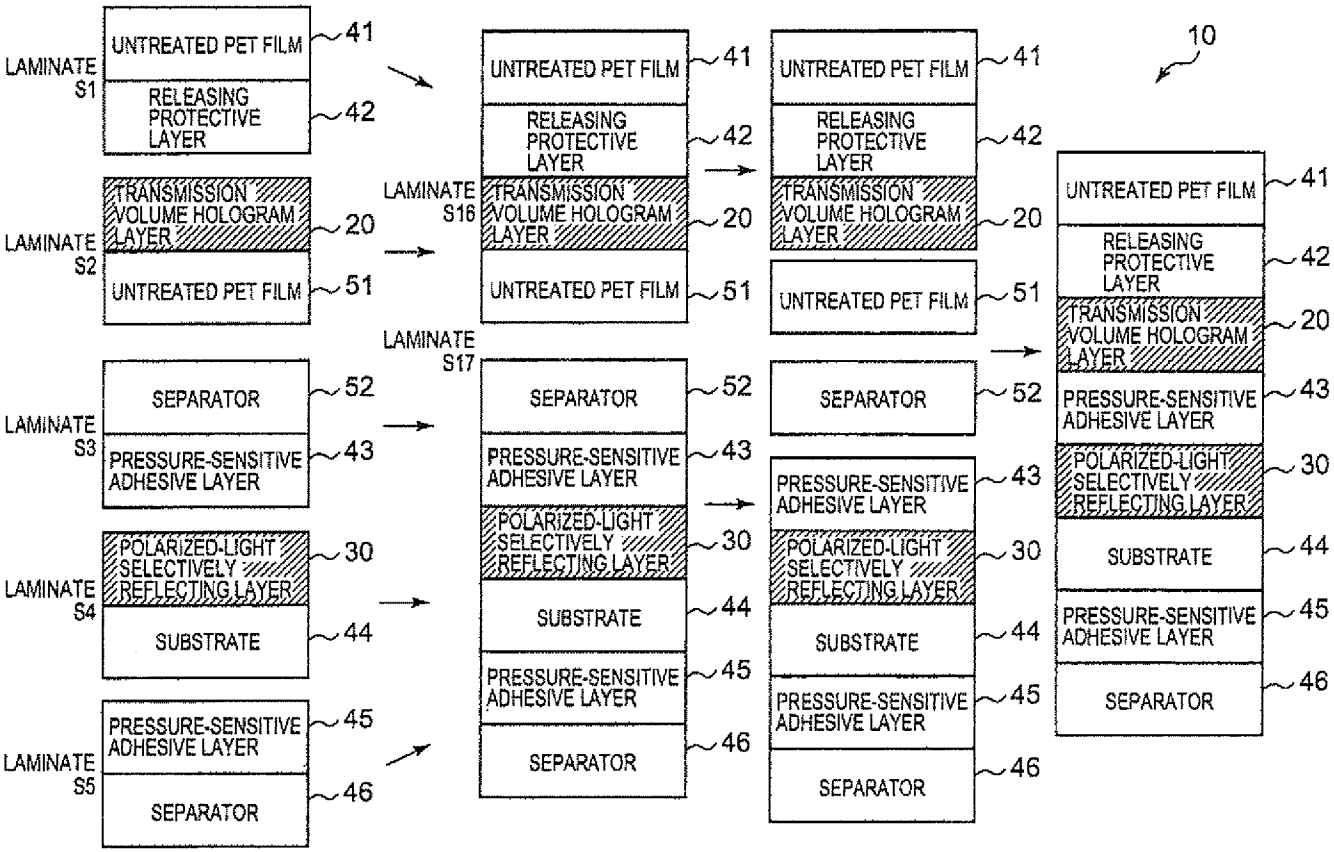
FIG. 9 is a chart for explaining a process for producing an authenticity indicator.

The authenticity indicator 10 having the untreated PET film 41 and the separator 46 can be produced as shown in FIG. 9, using laminates S1 to S5.

The laminate S1 is obtained by laminating an untreated PET film 41 and a releasing protective layer 42.

The releasing protective layer 42 can make it easy to separate therefrom the untreated PET film 41 when the authenticity indicator 10 is attached to a genuine article 1. In order to form the releasing protective layer 42, one of, or two or more of the following materials may be used: acrylic resins, vinyl chloride—vinyl acetate copolymer resins, polyester resins, polymethacrylate resins, polyvinyl chloride resins, cellulose resins, silicone resins, chlorinated rubber, casein, a variety of surface active agents, metal oxides, etc. Of the above materials, particularly preferred is a single acrylic resin having a molecular weight of approximately 20,000 to 100,000, or a composition composed of an acrylic resin and a vinyl chloride-vinyl acetate copolymer having a molecular weight of 8,000 to 20,000, in which 1 to 5% by weight of a polyester resin having a molecular weight of 1,000 to 5,000 is incorporated as an additive.

The laminate S1 having the releasing protective layer 42 can be obtained by applying a releasing-protective-layer-forming solution having the following composition to an untreated PET film 41 (e.g., Lumirror T60 (25 μm) manufactured by Toray Industries, Inc., Japan) with a bar coater so that the dry film would have a thickness of 1 μm, and then drying the wet coating in an oven at 100° C.

| (Releasing-Protective-Layer-Forming Solution) | |
|---|---|
| Polymethyl methacrylate (weight-average molecular weight 100,000) | 97 parts by weight |
| Polyethylene wax (weight-average molecular weight 10,000; mean particle diameter 5 μm) | 3 parts by weight |
| Solvent (methyl ethyl ketone/toluene = 1/1 (weight ratio)) | 400 parts by weight |

Next, the laminate S2 will be described. It is a laminate of an untreated PET film 51 and a transmission volume hologram layer 20. in order to form the laminate S2, the above-described volume-holographic-layer-forming solution is applied to an untreated PET film 51 (e.g., Lumirror T60 (50 μm) manufactured by Toray Industries Inc., Japan) with an applicator so that the dry film would have a thickness of 10 μm. The wet coating on the untreated PET film is then dried in an oven at 90° C. so as to form a volume holographic layer, thereby obtaining a laminate of the volume holographic layer 20/untreated PET film 51. The laminate thus obtained is brought into close contact with a hologram master (second master 38, see FIG. 5) and is illuminated with 80 mJ/cm$^2$ of laser light from the untreated PET film side, as described above. A hologram image is thus recorded in the volume holographic layer. Thereafter, the laminate is separated from the hologram master and then subjected to heat treatment and ultraviolet fixation exposure treatment, thereby obtaining the laminate S2.

The laminate S1 and the laminate S2 are thermally laminated at 80° C. with the releasing-protective layer 42 of the laminate S1 and the transmission volume hologram layer 20 of the laminate S2 faced each other. Thus, there is obtained a laminate 16 of the untreated PET film 41/releasing protective layer 42/transmission volume hologram layer 20/untreated PET film 51.

Next, the laminate S3 will be described. It is a laminate of a separator 52 and a pressure-sensitive adhesive layer 43. The laminate S3 can be obtained by applying a pressure-sensitive-adhesive-layer-forming solution having the following composition to a separator 52 (e.g., SPPET (50 μm) manufactured by TOHCELLO Co., Ltd., Japan) with an applicator so that the dry film would have a thickness of 20 μm and then drying the wet coating in an oven at 100° C.

| (Pressure-Sensitive-Adhesive-Layer-Forming Solution) | |
|---|---|
| Acrylic pressure-sensitive adhesive (Nissetsu PE-118 manufactured by Nippon Carbide Industries, Co., Ltd., Japan) | 100 parts by weight |

-continued

| (Pressure-Sensitive-Adhesive-Layer-Forming Solution) | |
|---|---|
| Isocyanate crosslinker (Nissetsu CK-101 manufactured by Nippon Carbide Industries, Co., Ltd., Japan) | 2 parts by weight |
| Solvent (methyl ethyl ketone/toluene/-ethyl acetate = 2/1/1 (weight ratio)) | 60 parts by weight |

Next, the laminate S4 will be described. It is composed of a substrate 44 and a polarized-light selectively reflecting layer 30 formed thereon. The laminate S4 can be obtained in the following manner.

The above-described cholesteric liquid crystalline solution is applied to the above-described substrate 44 with a bar coater so that the dry film would have a thickness of 1.6 μm. The wet coating is then heated in an oven at 80° C. for orientation (drying treatment). Subsequently, the cholesteric liquid crystal layer is irradiated, for example, with 3000 mJ/cm$^2$ of ultraviolet light of 365 nm in an atmosphere of nitrogen for curing, thereby forming, on the substrate 44, a polarized-light selectively reflecting layer 30 having a selective reflection center wavelength of 550 nm, capable of reflecting green light. There can thus be obtained the laminate S4 of the polarized-light selectively reflecting layer 30/substrate 44. The selective reflection center wavelength of the polarized-light selectively reflecting layer 30 can be changed by varying the ratio of the main agent of the cholesteric liquid crystalline solution, such as a nematic liquid crystal, to the chiral agent.

Next, the laminate S5 will be described. It is a laminate of a separator 46 and a pressure-sensitive adhesive layer (attachment layer) 45 and can be obtained in the same manner as that in which the laminate S3 is obtained.

The laminate S3 and the laminate S4 are laminated, with the pressure-sensitive adhesive layer 43 of the former and the polarized-light selectively reflecting layer 30 of the latter faced each other, and, at the same time, the laminate S4 and the laminate S5 are laminated, with the substrate 44 of the former and the pressure-sensitive adhesive layer 45 of the latter faced each other, thereby obtaining a laminate S17.

After separating the untreated PET film 51 from the laminate S16 and the separator 52 from the laminate S17, the two laminates are laminated, with the transmission volume hologram layer 20 of the laminate S16 and the pressure-sensitive adhesive layer 43 of the laminate S17 faced each other. Thus, there can be obtained an authenticity indicator 10.

[4. Actions of Authenticity Indicator]

How the authenticity indicator 10 acts when light enters it will be described below with reference mainly to FIG. 8. Those constituent elements having no optical functions, other than the transmission volume hologram layer 20 and the polarized-light selectively reflecting layer 30, are omitted from the view of the authenticity indicator 10 in FIG. 8.

Of the unpolarized light entering the transmission volume hologram layer 20 from the front side of the authenticity indicator 10 (the right-hand side in FIG. 8), the light entering at an angle α that meets the diffraction condition of the transmission volume hologram layer 20 (an angle that meets the Bragg condition of the transmission volume hologram layer) is shown in FIG. 8. Such light incident on the transmission volume hologram layer 20 is diffracted by this layer independently of its polarized-light component as long as its wavelength falls in the selective diffraction wavelength range of the transmission volume hologram layer 20. Namely, such incident light serves as a reconstruction wave (reconstruction light) and reconstructs the image recorded in the transmission volume hologram layer 20. Since the diffracted light L82L, L82R from the transmission volume hologram layer 20 reconstructs this image, the reconstructed image is positioned at the rear side of the transmission volume hologram layer 20 and the reconstructed image is displayed toward the rear side along which the diffracted light L82L, L82R travels; especially in this embodiment, the image is reconstructed in the direction perpendicular to the sheet plane of the authenticity indicator 10 (transmission volume hologram layer 20).

Further, as mentioned above, when diffracted by the transmission volume hologram layer 20, light reverses in the state of polarization (e.g., the direction in which the light is circularly polarized). Namely, light L81R, right-handed circularly polarized light, that has entered the transmission volume hologram layer 20 emerges from it as left-handed circularly polarized light L82L after being diffracted by it. On the other hand, light L81L, left-handed circularly polarized light, that has entered the transmission volume hologram layer 20 emerges from it as right-handed circularly polarized light L82R after being diffracted by it.

Of the diffracted light that has emerged from the transmission volume hologram layer 20 and enters the polarized-light selectively reflecting layer 30, light L83R that is a specified polarized-light component (e.g., right-handed circularly polarized light, one of two polarized-light components) responding to the polarized-light selectivity of the polarized-light selectively reflecting layer 30, and that has a wavelength in the selective reflection wave range of the polarized-light selectively reflecting layer 30 is reflected from the polarized-light selectively reflecting layer 30 by specular reflection. Therefore, in this embodiment, the light L83R is reflected in the direction from the rear side to the front side, vertically to the sheet plane of the authenticity indicator 10 (polarized-light selectively reflecting layer 30). The reflected light L83R re-enters the transmission volume hologram layer 20 from rear side and then emerges from the authenticity indicator 10 toward the front side.

On the other hand, of the diffracted light that has emerged from the transmission volume hologram layer 20 and enters the polarized-light selectively reflecting layer 30, light L84R that is a specified polarized-light component (e.g., right-handed circularly polarized light) responding to the polarized-light selectivity of the polarized-light selectively reflecting layer 30, but that has a wavelength not in the selective reflection wave range of the polarized-light selectively reflecting layer 30 is not reflected from the polarized-light selectively reflecting layer 30. Such light L84R emerges from the authenticity indicator 10 toward the rear side (back side).

Further, of the diffracted light that has emerged from the transmission volume hologram layer 20 and enters the polarized-light selectively reflecting layer 30, the light other than the specified polarized-light component (e.g., L82L) responding to the polarized-light selectivity of the polarized-light selectively reflecting layer 30 is not reflected from the polarized-light selectively reflecting layer 30. Such light L82L emerges from the authenticity indicator 10 toward the rear side (back side).

As mentioned above, the image is reconstructed from the authenticity indicator 10 to the front side by the light L83R, diffracted light, that is a specified polarized-light component responding to the polarized-light selectivity of the polarized-light selectively reflecting layer 30, and that has a wavelength in the selective reflection wavelength range of the polarized-light selectively reflecting layer 30. On the other hand, the image is reconstructed from the authenticity indicator 10 to the rear side by the L84R, diffracted light, that is a specified polarized-light component responding to the polarized-light selectivity of the polarized-light selectively reflecting layer 30, but that has a wavelength not in the selective reflection wavelength range of the polarized-light selectively reflecting layer 30, and by the diffracted light L82L that is not the specified polarized-light component responding to the polarized-light selectivity of the polarized-light selectively reflecting layer 30.

Referring now to FIG. 10, a comparison between the polarized-light selectively reflecting layer 30 having a cholesteric liquid crystalline structure (see Curve C in FIG. 10) and the transmission volume hologram layer 20 having a transmission volume hologram (see Curve H1 in FIG. 10) shows that the wavelength selectivity of the transmission volume hologram layer 20 is typically lower than that of the polarized-light selectively reflecting layer 30, and that the diffraction efficiency (reflection efficiency) of the transmission volume hologram layer 20 is higher than that of the polarized-light selectively reflecting layer 30 at every wavelength. Therefore, in the authenticity indicator 10 according to this embodiment, the brightness of the image visible from the front side of the authenticity indicator depends on the width of the selective reflection wavelength range of the polarized-light selectively reflecting layer 30 and on the diffraction efficiency of the polarized-light selectively reflecting layer 30 at wavelengths in the selective reflection wavelength range.

The diffraction efficiency of the polarized-light selectively reflecting layer 30 at its selective reflection center wavelength is 50% maximum, while the diffraction efficiency of the transmission volume hologram layer 20 at the selective reflection center wavelength can be more than 80% (see FIG. 10).

A comparison between the cholesteric liquid crystalline structure (see Curve C in FIG. 10) and the reflection volume hologram (see Curve H2 in FIG. 10) shows that the wavelength selectivity of the former is typically lower than that of the latter, and that the full width (at) half maximum (FWHM) in the former is much greater than that in the latter. Therefore, although the reflection volume hologram has a peak diffraction efficiency (peak reflectance) higher than that of the cholesteric liquid crystalline structure, the total quantity of the light (i.e., the greatness of an area surrounded by the horizontal axis and the curve) diffracted by (reflected from) the cholesteric liquid crystalline structure is much greater than that of the light diffracted by the reflection volume hologram.

For the above-described reason, the authenticity indicator 10 in this embodiment can provide a much brighter image, visible from the front side, as compared with an authenticity indicator using a reflection volume hologram. The authenticity of the authenticity indicator 10 can therefore be checked easily and accurately.

Further, the light that reconstructs the image in front of the authenticity indicator 10 is a specified polarized-light component (e.g., right-handed circularly polarized light) only. Therefore, when the light that has emerged from the authenticity indicator 10 toward the front side is passed through an absorption polarizer capable of absorbing the specified polarized-light component (e.g., L83R in FIG. 8), the image that has been visible from the front side becomes invisible. On the other hand, if the light (e.g., L81L in FIG. 8) that will enter the authenticity indicator 10 is passed through an absorption polarizer capable of absorbing a light component polarized in the opposite direction to the specified polarized-light component, the image that has been visible from the front becomes invisible. By making use of these features, the authenticity of the authenticity indicator 10 can be checked easily and accurately.

Furthermore, the light (e.g., L84R in FIG. 8) that reconstructs the image at the rear of the authenticity indicator 10 contains a specified polarized-light component (e.g., right-handed circularly polarized light) having a wavelength not in the selective reflection wavelength range of the polarized-light selectively reflecting layer 30. Therefore, if the light that has emerged from the backside of the authenticity indicator 10 is passed through an absorption polarizer capable of absorbing the specified polarized-light component, the image visible from the rear side of the authenticity indicator 10 gets dark. On the other hand, if the light (e.g., L81L in FIG. 8) that will enter the authenticity indicator 10 is passed through an absorption polarizer capable of absorbing a light component polarized in the opposite direction to the specified polarized-light component, the image visible from the rear side of the authenticity indicator 10 becomes dark. By making use of these features, the authenticity of the authenticity indicator 10 can be checked easily and accurately.

Furthermore, the light that reconstructs the image in front of the authenticity indicator 10 is only light with wavelengths in the selective reflection wavelength range that can be reflected from the polarized-light selectively reflecting layer 30. Especially in this embodiment, this light is recognized as a specified color (e.g., green). Therefore, if the light that has emerged from the authenticity indicator 10 toward the front side is passed through a band pass filter capable of absorbing light with wavelengths in the selective reflection wavelength range, the image that has been visible from the front side becomes invisible. Also when the light that will enter the authenticity indicator 10 is passed through a band pass filter capable of absorbing light with wavelengths in the selective reflection wavelength range, the image that has been visible from the front side becomes invisible. These features make it possible to check the authenticity indicator 10 authentic with ease and accuracy.

Furthermore, the light that reconstructs the image in front of the authenticity indicator 10 is only light with wavelengths in the selective reflection wavelength range that can be reflected from the polarized-light selectively reflecting layer 30. Especially in this embodiment, this light is recognized as a specified color (e.g., green). Therefore, if the light that has emerged from the authenticity indicator 10 toward the front side is passed through a band pass filter capable of transmitting only light with wavelengths in the selective reflection wavelength range, the image becomes more clearly visible from the front side. Also when the light that will enter the authenticity indicator 10 is passed through a band pass filter capable of transmitting only light with wavelengths in the selective reflection wavelength range, the image becomes more clearly visible from the front side. These features make it possible to check the authenticity indicator 10 authentic with ease and accuracy.

As mentioned above, according to the authenticity indicator 10 in this embodiment, its authenticity can be accurately confirmed by making use of its first authenticity recognition function attributed to the diffracting action of the transmission volume hologram layer 20 and its second authenticity recognition function attributed to the polarized-light selectivity of the polarized-light selectively reflecting layer 30. Specifically, for example, the authenticity of the authenticity indicator can be confirmed by making light enter the transmission volume hologram layer 20 at an angle that meets the diffraction condition of the layer and checking whether the diffracting action occurs or not, preferably whether the image recorded in the transmission volume hologram layer 20 is reproduced or not. The authenticity of the authenticity indicator can be confirmed more accurately by observing the state of polarization of light emerging from the authenticity indicator 10, using an absorption polarizer or the like. Further, the image reconstructed from the authenticity indicator 10 is brighter than that reconstructed from an authenticity indicator using a reflection volume hologram. Therefore, the authenticity of the authenticity indicator 10 can be confirmed more accurately by the reconstructed image that is bright. In addition, since the recording of an image to give a transmission volume hologram and the duplication of a transmission volume hologram require sophisticated techniques and special facilities, and also special materials whose distribution is supervised, it is extremely difficult to forge the transmission volume hologram layer 20. This means that the authenticity indicator 10 of the invention has an outstanding forgery preventing effect.

In the above description of the actions of the authenticity indicator 10, the authenticity indicator 10 is attached to a transparent portion of a genuine article 1, and the authenticity of the authenticity indicator 10 is confirmed by both the light reflected from the authenticity indicator 10 and the light transmitted by the authenticity indicator 10 and the genuine article 1. According to this embodiment, however, the light reflected from the authenticity indicator 10 is sufficient enough to confirm the authenticity of the authenticity indicator 10, as mentioned above. Therefore, to attach the authenticity indicator 10 in this embodiment to an opaque genuine article is also effective.

[5. Structure and Actions of Authenticity Checking System]

As mentioned above, the authenticity checking system 100 in this embodiment comprises a light source 102, a front side checking unit 105 having a front side light-receiving device 104, and a rear side checking unit 107 having a rear side light-receiving device 106. In this authenticity checking system100, light is emitted from the light source 102 on the authenticity indicator 10, and the authenticity of the authenticity indicator 10 can be checked by the light emerging from the authenticity indicator 10 toward the front side and/or toward the rear side, particularly by the image reconstructed by the light.

The light source 102 in this embodiment is placed in front of the authenticity indicator 10 and is supported (set) in such a manner that the angle at which the light from the light source 102 enters the authenticity indicator 10 can be properly controlled. The light from the light source 102 can therefore be made to enter the authenticity indicator 10 that is to be checked for its authenticity, at an angle that meets the diffraction condition of the transmission volume hologram layer 20 (an angle that meets the Bragg condition of the transmission volume hologram). Consequently, it is possible to increase the quantity of the light (diffracted light) that forms the image visible from the front side and the rear side of the authenticity indicator 10, and the authenticity of the authenticity indicator 10 can therefore be checked accurately.

The light source 102, however, is not requisite for the authenticity checking system 100. In the case where the quantity of the light (diffracted light) that reconstructs the image visible from the front side and the rear side of the authenticity indicator 10 is great enough to check the authenticity of the authenticity indicator 10 accurately, it is preferable to eliminate the light source 102 from the authenticity checking system 100.

It is herein preferred that the authenticity checking system 100 be structured so that the polarized component of the light to be emitted on the authenticity indicator 10 from the light source 102 is changeable. Such a structure can be realized by incorporating an absorption polarizer 111 capable of absorbing a specified polarized-light component in the light source 102, or by placing the absorption polarizer 111 between the light source 102 and the authenticity indicator 10, in the optical path along which the light from the light source 102 travels to enter the authenticity indicator 10.

As mentioned previously, the light that reconstructs the image in front of the authenticity indicator 10 is a specified polarized-light component (e.g., right-handed circularly polarized light) only. Therefore, by changing the polarized component of the light emitted from the light source 102, the image can be reconstructed in front of the authenticity indicator 10, and the image that has been visible can be made invisible. On the other hand, the light that reconstructs the image at the rear of the authenticity indicator 10 are a specified polarized-light component (e.g., right-handed circularly polarized light) having a wavelength not in the selective reflection wave range of the polarized-light selectively reflecting layer 30 and polarized light excluding the specified polarized-light component. Therefore, by changing the polarized component of the light emitted from the light source 102, it is possible to vary the brightness of the image reconstructed at the rear of the authenticity indicator 10. By making use of these features, the authenticity of the authenticity indicator 10 can be checked easily and accurately.

It is also preferred that the authenticity checking system 100 be structured so that the wavelength range in which the wavelength of the light to be emitted from the light source 102 on the authenticity indicator 10 falls is properly changeable. Such a structure can be realized by incorporating, in the light source 102, a band pass filter 112 capable of transmitting or absorbing only light in a predetermined wavelength range, or by placing the band pass filter 112 between the light source 102 and the authenticity indicator 10, in the optical path along which the light from the light source 102 travels to enter the authenticity indicator 10.

As described above, the light that reconstructs the image in front of the authenticity indicator 10 is only light with wavelengths in the selective reflection wavelength range that can be reflected from the polarized-light selectively reflecting layer 30. Especially in this embodiment, this light is recognized as a specified color (e.g., green). Therefore, by changing the wavelength range in which the wavelength of the light to be emitted from the protector 102 falls, it is possible to reconstruct the image in front of the authenticity indicator 10 and also to make the image that has been visible invisible. Further, if the light source 102 is allowed to emit only light with wavelengths in the selective reflection wavelength range, the reconstructed image can be viewed more clearly from the front of the authenticity indicator 10. By making use of these features, the authenticity of the authenticity indicator 10 can be checked easily and accurately.

Since the diffracted light (image) from the authenticity indicator 10 travels in the direction perpendicular to the sheet plane of the authenticity indicator 10, the front side light-receiving device 104 of the front side checking unit 105 in this embodiment is placed on the front side of the authenticity indicator 10 so as to face the authenticity indicator 10. For the same reason, the rear side light-receiving device 106 of the rear side checking unit 107 is placed on the rear side of the authenticity indicator 10 so as to face the authenticity indicator 10. Each light-receiving device 104, 106 may be composed of a CCD camera, for example. The checking units 105, 107 further contain analysis device (not shown in the figure) for making image analysis on the basis of the information from the light-receiving device 104, 106, which are connected to the light-receiving device 104, 106. Programs have been loaded beforehand on the analysis device, and the authenticity of the authenticity indicator 10 is checked with the aid of the programs, by confirming whether or not the image is reconstructed in front of and at the rear of the authenticity indicator 10, or by determining the brightness of the reconstructed image. Such an analysis device may be composed of a general-purpose computer or the like.

Preferably, the authenticity checking system 100 is structured so that the polarized component of the light to be received by the front side light-receiving device 104 is changeable. Such a structure can be realized by incorporating an absorption polarizer 115 capable of absorbing a specified polarized-light component in the front side checking unit 105 (specifically, in the front side light-receiving device 104), or by placing the absorption polarizer 115 between the front side checking unit 105 and the authenticity indicator 10, in the optical path along which the light that has emerged from the authenticity indicator 10 travels to enter the front side checking unit 105.

As mentioned above, the light that reconstructs the image in front of the authenticity indicator 10 is a specified polarized-light component (e.g., right-handed circularly polarized light) only. Therefore, by changing the polarized component of the light to be received by the front side light-receiving device 104, the reconstructed image that has been visible can be made invisible, for example. By making use of this feature, the authenticity of the authenticity indicator 10 can be checked easily and accurately.

It is also preferred that the authenticity checking system 100 be structured so that the wavelength range in which the wavelength of the light to be received by the front side light-receiving device 104 falls is properly changeable. Such a structure can be realized by incorporating a band pass filter 116 capable of transmitting or absorbing only light in a predetermined wavelength range in the front side checking unit 105 (specifically, in the front side light-receiving device 104), or by placing the band pass filter 116 between the front side checking unit 105 and the authenticity indicator 10, in the optical path along which the light that has emerged from the authenticity indicator 10 travels to enter the front side checking unit 105.

As described above, the light that reconstructs the image in front of the authenticity indicator 10 is only light with wavelengths in the selective reflection wavelength range that can be reflected from the polarized-light selectively reflecting layer 30. Especially in this embodiment, this light is recognized as a specified color (e.g., green). Therefore, if the light to be received by the front side light-receiving device 104 is passed through a band pass filter capable of transmitting only light with wavelengths in the selective reflection wavelength range, the reconstructed image becomes more clearly visible from the front of the authenticity indicator 10. On the other hand, if the light to be received by the front side light-receiving device 104 is passed through a band pass filter capable of absorbing only light with wavelengths in the selective reflection wavelength range, the reconstructed image that has been visible becomes invisible from the front of the authenticity indicator 10. By making use of these features, the authenticity of the authenticity indicator 10 can be checked easily and accurately.

Further, it is preferred that the elements disposed on the rear side of the authenticity indicator 10 be arranged similarly to those disposed on the front side of the authenticity indicator 10.

Preferably, the authenticity checking system 100 is structured so that the polarized component of the light to be received by the rear side light-receiving device 106 is changeable. Such a structure can be realized by incorporating an absorption polarizer 117 capable of absorbing a specified polarized-light component in the rear side checking unit 107 (specifically, in the rear side light-receiving device 106), or by placing the absorption polarizer 117 between the rear side checking unit 107 and the authenticity indicator 10, in the optical path along which the light that has emerged from the authenticity indicator 10 travels to enter the rear side checking unit 107.

It is also preferred that the authenticity checking system 100 be structured so that the wavelength range in which the wavelength of the light to be received by the rear side light-receiving device 106 falls is properly changeable. Such a structure can be realized by incorporating a band pass filter 118 capable of transmitting or absorbing only light in a predetermined wavelength range in the rear side checking unit 107 (specifically, in the rear side light-receiving device 106), or by placing the band pass filter 118 between the rear side checking unit 107 and the authenticity indicator 10, in the optical path along which the light that has emerged from the authenticity indicator 10 travels to enter the rear side checking unit 107.

[6. Modifications]

Figure 13:
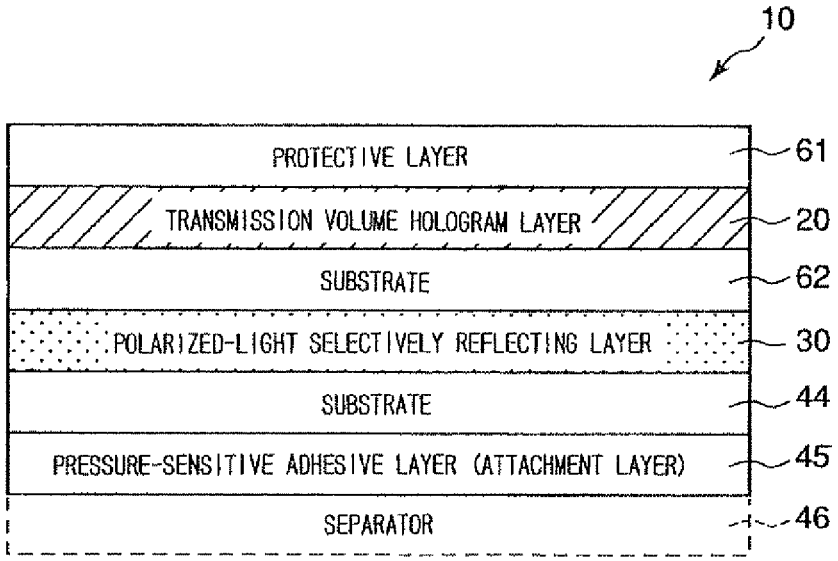
FIG. 13 is another schematic structural view of an authenticity indicator.
Figure 14:
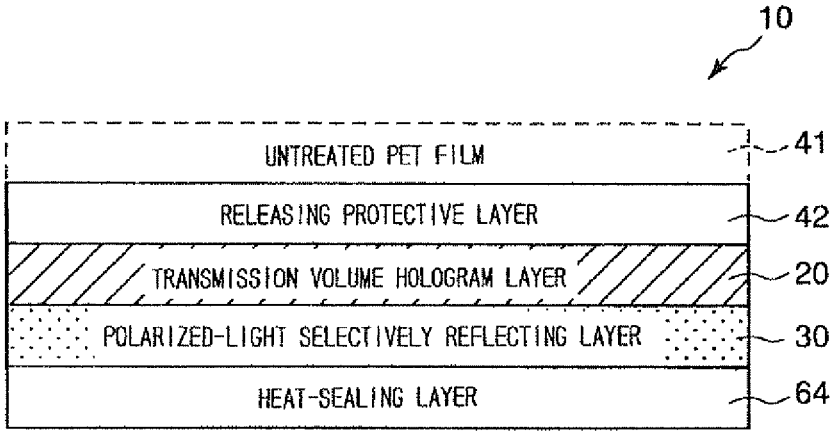
FIG. 14 is a further schematic structural view of an authenticity indicator.

Various modifications may be made to the aforementioned embodiment of the present invention. Some modifications to the above embodiment will be described below with reference to FIGS. 12 to 14. In FIGS. 1 to 10 showing the embodiment of the present invention and in FIGS. 12 to 14 showing modifications to the embodiment, same or corresponding parts are designated by like reference characters, and the detailed description of these parts in the modifications will not be given below.

[6.1. Modification 1]

In the above-described embodiment, the authenticity of the authenticity indicator 10 is checked by the light that has entered the authenticity indicator 10 (transmission volume hologram layer) at an angle α that meets the diffraction condition of the transmission volume hologram. The present invention is not limited to this. For example, as shown in FIG. 12, the authenticity of the authenticity indicator 10 may also be checked by the light that enters the transmission volume hologram layer 20 from the rear side (back side) at an angle α that meets the diffraction condition of the transmission volume hologram, after being reflected from the polarized-light selectively reflecting layer 30.

Figure 12:
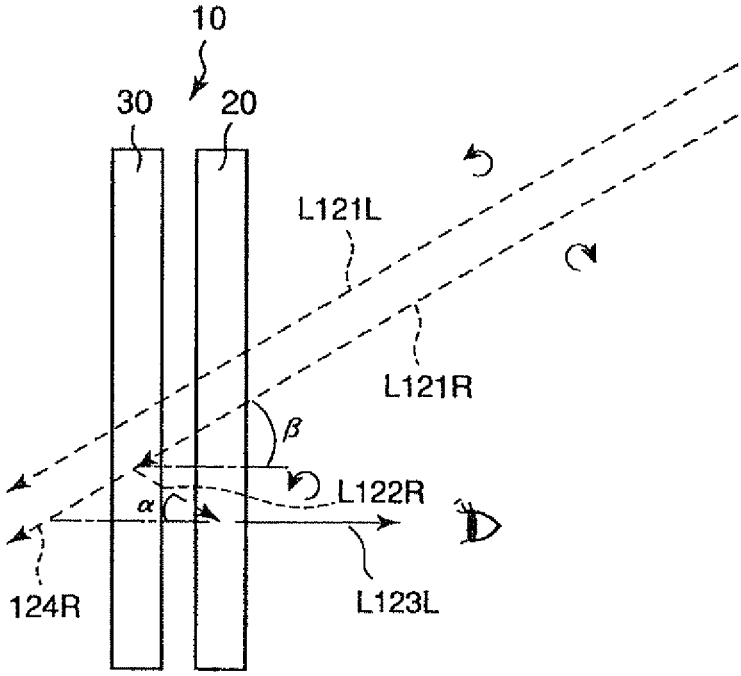
FIG. 12 is an illustration for explaining other optical function of an authenticity indicator.

In FIG. 12, light enters the authenticity indicator 10 (transmission volume hologram) at an angle β that does not meet the diffraction condition of the transmission volume hologram. Such incident light L121R, L121L passes through the transmission volume hologram layer 20 and enters the polarized-light selectively reflecting layer 30, as shown in FIG. 12.

Of the light that has entered the polarized-light selectively reflecting layer 30, light L122R that is a specified polarized-light component (e.g., right-handed circularly polarized light) responding to the polarized-light selectivity of the polarized-light selectively reflecting layer 30, and that has a wavelength in the selective reflection wavelength range of the polarized-light selectively reflecting layer 30 is reflected from the polarized-light selectively reflecting layer 30 by specular reflection and re-enters the transmission volume hologram layer 20 from the rear side. On the other hand, light L124R that is a specified polarized-light component (e.g., right-handed circularly polarized light) responding to the polarized-light selectivity of the polarized-light selectively reflecting layer 30, but that has a wavelength not in the selective reflection wavelength range of the polarized-light selectively reflecting layer 30, and light L121L that is a polarized-light component other than the specified polarized-light component responding to the polarized-light selectivity of the polarized-light selectively reflecting layer 30 pass through the polarized-light selectively reflecting layer 30 and emerge from the authenticity indicator 10 toward the rear side.

As shown in FIG. 12, when the light L122R reflected from the polarized-light selectively reflecting layer 30 enters the transmission volume hologram layer 20 from the rear side at an angle α that meets the diffraction condition of the transmission volume hologram, it is diffracted by the transmission volume hologram layer 20. Namely, such reflected light L122R serves as a reconstruction wave and reconstructs the image recorded in the transmission volume hologram layer 20.

Diffracted light L123L from the transmission volume hologram layer 20 forms this image. In the example shown in the figure, the image is reconstructed in the direction from the rear side to the front side, along which the diffracted light L123L travels, vertically to the sheet plane of the authenticity indicator 10 (transmission volume hologram layer 20). Further, when diffracted by the transmission volume hologram layer 20, the light reverses in the state of polarization. Therefore, the state of polarization of the diffracted light L123L that reconstructs the image is the reverse of the specified polarized-light component (e.g., right-handed circularly polarized light) responding to the polarized-light selectivity of the polarized-light selectively reflecting layer 30, that is, a left-handed circularly polarized light, for example.

Thus, in this modification, the image is reconstructed in front of the authenticity indicator 10 by diffracted light L123L, a polarized-light component (e.g., left-handed circularly polarized-light component) that is the reverse of the specified polarized-light component responding to the polarized-light selectivity of the polarized-light selectively reflecting layer 30, and whose wavelength falls in the selective reflection wavelength range of the polarized-light selectively reflecting layer 30. On the other hand, the image is not reconstructed at the rear of the authenticity indicator 10 in this modification. Therefore, the genuine article 1 to which the authenticity indicator 10 is attached is not needed to be transparent.

In such a modification, the image visible from the front side of the authenticity indicator is much brighter than that visible from the front side of an authenticity indicator using a reflection volume hologram for the same reason as in the embodiment shown in FIGS. 1 to 10. The authenticity of the authenticity indicator can therefore be checked easily and accurately.

Further, the light that travels towards the front side of the authenticity indicator 10 to reconstruct the image is a specified polarized-light component (e.g., right-handed circularly polarized light) only. The authenticity of the authenticity indicator can therefore be checked easily and accurately by the use of an absorption polarizer capable of absorbing the specified polarized-light component, as in the embodiment shown in FIGS. 1 to 10.

Furthermore, the light that reconstructs the image in front of the authenticity indicator 10 is only light with wavelengths in the selective reflection wavelength range that can be reflected from the polarized-light selectively reflecting layer 30. It is therefore possible to check the authenticity of the authenticity indicator easily and accurately by the use of a band pass filter capable of absorbing or transmitting only light with wavelengths in the selective reflection wavelength range, like in the embodiment shown in FIGS. 1 to 10.

In this modification, since light enters the polarized-light selectively reflecting layer 30 obliquely, the apparent selective reflection wavelength range of the polarized-light selectively reflecting layer is shifted to the shorter wavelength side.

It is therefore preferable to set the selective reflection wavelength range of the polarized-light selectively reflecting layer 30 in this modification to a wavelength range shorter than the actual wavelength range of the light to be reflected, with consideration for the angle of incidence that meets the diffraction condition of the transmission volume hologram. The selective reflection wavelength range of the polarized-light selectively reflecting layer 30 can be controlled, for example, by varying the ratio of the main agent, such as a nematic liquid crystal, to the chiral agent when forming the layer.

[6.2. Modification 2]

In the aforementioned embodiment, a chiral nematic liquid crystal is used for the polarized-light selectively reflecting layer 30 that has a cholesteric liquid crystalline structure. The present invention is not limited to this, and a cholesteric liquid crystal or the like may also be used, for example.

[6.3. Modification 3]

In the above-described embodiment, the authenticity indicator 10 comprises a plurality of layers in addition to the transmission volume hologram layer 20 and the polarized-light selectively reflecting layer 30, as shown in FIG. 2. The layer construction of the authenticity indicator 10 shown in FIG. 2 is merely an example, and it may be modified as shown in FIG. 13 or 14, for example.

In an example shown in FIG. 13, the authenticity indicator 10 comprises a protective layer 61, a transmission volume hologram layer 20, a substrate 62, a polarized-light selectively reflecting layer 30, a substrate 44, a pressure-sensitive adhesive layer (attachment layer) 45, and a separator 46 that are laminated in the order mentioned, the protective layer 61 being the outermost layer on the observation side. For the substrate 62, it is preferable to use a thin substrate so that the state of polarization of the light passing through the substrate 62 will not be disturbed, like the substrate 44 in the above-described embodiment. It is also preferable to reduce the influence of double refraction of the substrate on the polarized-light selectively reflecting layer 30 by superposing two sheets of the substrate 62 so that the directions of their anisotropy cross at right angles.

In an example shown in FIG. 14, the authenticity indicator 10 comprises an untreated PET film 41, a releasing protective layer 42, a transmission volume hologram layer 20, a polarized-light selectively reflecting layer 30, and a heat-sealing layer 64 that are laminated in the order mentioned, the untreated PET film 41 being the outermost layer on the observation side.

The embodiment shown in FIGS. 1 to 9 and the modifications to the embodiment have been described above. It is a matter of course that a proper combination of some of the above modifications is also applicable.

What is claimed is:

1. An authenticity indicator in the form of a sheet, whose authenticity can be checked by means of light emerging therefrom to a front side or light emerging therefrom to a rear side, comprising:

a polarized-light selectively reflecting layer that reflects a specified polarized component of incident light, and a transmission volume hologram layer disposed on the front side of the polarized-light selectively reflecting layer, wherein the transmission volume hologram layer diffracts, approximately vertically to the authenticity indicator, light entering from the front side at a specified angle and allows the diffracted light to emerge from the transmission volume hologram layer to the rear side.

2. The authenticity indicator according to claim 1, wherein the polarized-light selectively reflecting layer has a cholesteric liquid crystalline structure.

3. An authenticity checking method comprising the steps of:

making light enter an authenticity indicator from a front side, the authenticity indicator comprising a polarized-light selectively reflecting layer that reflects a specified polarized component of incident light, and a transmission volume hologram layer disposed on the front side of the polarized-light selectively reflecting layer, and checking the authenticity of the authenticity indicator by means of light emerging from the authenticity indicator to the front side, wherein in the step of checking the authenticity of the authenticity indicator, the authenticity of the authenticity indicator is checked by means of light emerging from the authenticity indicator to the front side and light emerging from the authenticity indicator to a rear side.

4. The authenticity checking method according to claim 3, wherein in the step of checking the authenticity of the authenticity indicator, the authenticity is checked by observing light that has passed through an absorption polarizer after emerging from the authenticity indicator.

5. The authenticity checking method according to claim 3, wherein in the step of checking the authenticity of the authenticity indicator, the authenticity is checked by observing light that has passed through a band pass filter after emerging from the authenticity indicator.

6. The authenticity checking method according to claim 3, wherein the transmission volume hologram layer has an image recorded therein, and in the step of checking the authenticity of the authenticity indicator, the authenticity is checked by confirming whether light emerging from the authenticity indicator reconstructs the image or not, or by confirming whether light emerging from the authenticity indicator reconstructs the image or not and also by observing brightness of the reconstructed image.

7. The authenticity checking method according to claim 3, wherein in the step of making light enter the authenticity indicator, light is allowed to enter the authenticity indicator so that the light enters the transmission volume hologram layer from the front side at an angle that meets a diffraction condition of the transmission volume hologram layer.

8. The authenticity checking method according to claim 3, wherein in the step of making light enter the authenticity indicator, light is allowed to enter the authenticity indicator so that, after being reflected from the polarized-light selectively reflecting layer, light enters the transmission volume hologram layer from the rear side at an angle that meets a diffraction condition of the transmission volume hologram layer.

9. An authenticity checking system for checking the authenticity of an authenticity indicator comprising a polarized-light selectively reflecting layer that reflects a specified polarized component of incident light, and a transmission volume hologram layer disposed on a front side of the polarized-light selectively reflecting layer, comprising:

a front side checking unit having a front side light-receiving device that is disposed on the front side of the authenticity indicator and receives, of the incident light on the authenticity indicator, light that has emerged from the authenticity indicator to the front side; and a rear side checking unit having a rear side light-receiving device that is disposed on a rear side of the authenticity indicator and receives, of the incident light on the authenticity indicator, light that has emerged from the authenticity indicator to the rear side, wherein the front side checking unit is configured to check the authenticity of the authenticity indicator based on data of the light received by the front side light-receiving device, and wherein the rear side checking unit is configured to check the authenticity of the authenticity indicator based on data of the light received by the rear side light-receiving device.

10. The authenticity checking system according to claim 9, further comprising a band pass filter that is disposed on the front side or the rear side of the authenticity indicator so that at least one of following light can enter the band pass filter: light that will enter the authenticity indicator from the front side, light that has emerged from the authenticity indicator to the front side, and light that has emerged from the authenticity indicator to the rear side.

11. The authenticity checking system according to claim 9, further comprising an absorption polarizer that is disposed on the front side or the rear side of the authenticity indicator so that at least one of following light can enter the absorption polarizer: light that will enter the authenticity indicator from the front side, light that has emerged from the authenticity indicator to the front side, and light that has emerged from the authenticity indicator to the rear side.

12. The authenticity checking system according to claim 9, wherein the transmission volume hologram layer has an image recorded therein, and the front and rear side checking units are configured to check the authenticity of the authenticity indicator by confirming whether the image is reconstructed by the front and rear side light to be received by the light-receiving device or not, or by confirming whether the image is reconstructed by the light to be received by the front and rear side light-receiving device or not and also by observing brightness of the reconstructed image.

13. The authenticity checking system according to claim 9, further comprising a light source that emits light on the authenticity indicator from the front side.

14. The authenticity checking system according to claim 13, wherein the light source is configured to emit light on the authenticity indicator so that the light enters the transmission volume hologram layer from the front side at an angle that meets a diffraction condition of the transmission volume hologram layer.

15. The authenticity checking system according to claim 13, wherein the light source is configured to emit light on the authenticity indicator so that, after being reflected from the polarized-light selectively reflecting layer, the light enters the transmission volume hologram layer from the rear side at an angle that meets a diffraction condition of the transmission volume hologram layer.

*16. The authenticity checking method according to claim 3, wherein, in the step of making light enter the authenticity indicator, light is allowed to enter the authenticity indicator so that the light enters the transmission volume hologram layer from the front side at an angle that meets a diffraction condition of the transmission volume hologram layer and said light is diffracted approximately vertically to the authenticity indicator.*

*17. The authenticity checking method according to claim 3, wherein, in the step of making light enter the authenticity indicator, light is allowed to enter the authenticity indicator so that, after being reflected from the polarized-light selectively reflecting layer, the light enters the transmission volume hologram layer from the rear side at an angle that meets a diffraction condition of the transmission volume hologram layer and said light is diffracted approximately vertically to the authenticity indicator.*

*18. The authenticity checking system according to claim 13, wherein the light source is configured to emit light on the authenticity indicator so that the light enters the transmission volume hologram layer from the front side at an angle that meets a diffraction condition of the transmission volume hologram layer and said light is diffracted approximately vertically to the authenticity indicator.*

*19. The authenticity checking system according to claim 13, wherein the light source is configured to emit light on the authenticity indicator so that, after being reflected from the polarized-light selectively reflecting layer, the light enters the transmission volume hologram layer from the rear side at an angle that meets a diffraction condition of the transmission volume hologram layer and said light is diffracted approximately vertically to the authenticity indicator.*

* * * * *